(12) United States Patent
Vakalapudi

(10) Patent No.: US 9,380,264 B1
(45) Date of Patent: Jun. 28, 2016

(54) SYSTEM AND METHOD FOR VIDEO COMMUNICATION

(71) Applicant: Siva Prasad Vakalapudi, Mississauga (CA)

(72) Inventor: Siva Prasad Vakalapudi, Mississauga (CA)

( * ) Notice: Subject to any disclaimer, the term of this patent is extended or adjusted under 35 U.S.C. 154(b) by 0 days.

(21) Appl. No.: 14/622,939

(22) Filed: Feb. 16, 2015

(51) Int. Cl.
*H04N 7/14* (2006.01)
*H04L 29/06* (2006.01)

(52) U.S. Cl.
CPC ............ *H04N 7/147* (2013.01); *H04L 65/1069* (2013.01); *H04N 7/148* (2013.01)

(58) Field of Classification Search
CPC ..... H04N 7/147; H04N 7/148; H04L 65/1069
USPC ............ 348/14.01, 14.03, 143; 370/259, 310; 379/142.06, 265.09; 382/209; 455/456.1; 709/228, 206, 204; 715/719, 234, 727, 205; 718/100; 719/318; 725/62, 114; 705/14.73; 707/791, 804; 717/107
See application file for complete search history.

(56) References Cited

U.S. PATENT DOCUMENTS

| | | | | |
|---|---|---|---|---|
| 5,940,834 A * | 8/1999 | Pinard | ............... | G06F 17/30893 |
| 6,209,007 B1 * | 3/2001 | Kelley | ............... | G06F 17/30867 707/999.102 |
| 6,212,536 B1 * | 4/2001 | Klassen | ............... | G06F 17/3089 707/E17.116 |
| 6,750,896 B2 * | 6/2004 | McClure | ................ | H04N 7/148 348/14.01 |
| 6,917,962 B1 * | 7/2005 | Cannata | ................ | G06Q 10/10 709/203 |
| 6,957,416 B2 * | 10/2005 | Adams | ................ | G06F 17/2247 715/201 |
| 7,551,782 B2 * | 6/2009 | Haim Lev | ............... | G06K 9/325 382/209 |
| 7,564,962 B1 * | 7/2009 | O'Keeffe | ............ | H04M 3/5191 370/401 |
| 8,027,442 B2 * | 9/2011 | Crandell | ............... | H04L 12/585 379/142.06 |
| 8,527,943 B1 * | 9/2013 | Chiluvuri | ................... | G06F 8/30 717/106 |
| 8,773,532 B2 * | 7/2014 | Wengrovitz | ........... | H04N 7/181 348/143 |
| 8,935,299 B2 * | 1/2015 | Marlow | ............ | G06F 17/30699 707/796 |
| 8,947,489 B2 * | 2/2015 | Lindberg | ................ | H04L 65/00 348/14.01 |
| 8,963,983 B2 * | 2/2015 | Ho | .................... | H04M 1/72522 348/14.01 |
| 9,031,988 B2 * | 5/2015 | Tymoshenko | .... | G06F 17/30887 707/601 |
| 9,135,364 B1 * | 9/2015 | Sundaram | ........... | H04L 67/2852 |
| 2007/0265031 A1 * | 11/2007 | Koizumi | ............. | H04M 1/0225 455/556.1 |
| 2008/0250108 A1 * | 10/2008 | Levy | ................... | H04L 12/1827 709/206 |
| 2010/0161430 A1 * | 6/2010 | Mandel | .................. | G06Q 30/02 705/14.73 |
| 2011/0145868 A1 * | 6/2011 | Hultkrantz | ............. | H04N 7/152 725/62 |
| 2012/0124227 A1 * | 5/2012 | Al-Khowaiter | ..... | H04L 65/1046 709/228 |
| 2012/0260298 A1 * | 10/2012 | Chen | .................. | H04N 7/17318 725/114 |
| 2013/0174038 A1 * | 7/2013 | Sudhakar Palla | ......... | G06F 3/14 715/719 |
| 2013/0272178 A1 * | 10/2013 | Cho | ....................... | H04W 92/18 370/310 |
| 2014/0082622 A1 * | 3/2014 | Yang | ....................... | G06F 9/445 718/100 |
| 2014/0115479 A1 * | 4/2014 | Wang | ..................... | H04L 67/322 715/727 |
| 2014/0173667 A1 * | 6/2014 | Koizumi | ............ | H04N 21/4314 725/62 |
| 2014/0259029 A1 * | 9/2014 | Choi | ..................... | G06F 3/0481 719/318 |
| 2014/0293832 A1 * | 10/2014 | Parikh | ................... | H04M 15/57 370/259 |
| 2015/0004999 A1 * | 1/2015 | Schuler | ................. | H04W 64/00 455/456.1 |
| 2015/0063172 A1 * | 3/2015 | Taylor | ................. | H04L 65/4015 370/259 |
| 2015/0103131 A1 * | 4/2015 | Denoue | .................. | H04N 7/147 348/14.03 |

* cited by examiner

*Primary Examiner* — Gerald Gauthier

(74) *Attorney, Agent, or Firm* — Grandhi Law Chambers; Krishna Grandhi

(57) ABSTRACT

The present invention is a method and system for establishing a video call between two or more persons through two or more computer devices and/or mobile devices. The present invention can be utilized to enable any website to be video call enabled, so that a video call can be initiated from any website. During the call the present invention may recognize words, phrases, key topics or other content of the video call discussion in real time or virtually real time, and disseminate such information to the participants in the call as well as to other followers, friends or other affiliates of persons engaged in the video call.

17 Claims, 22 Drawing Sheets

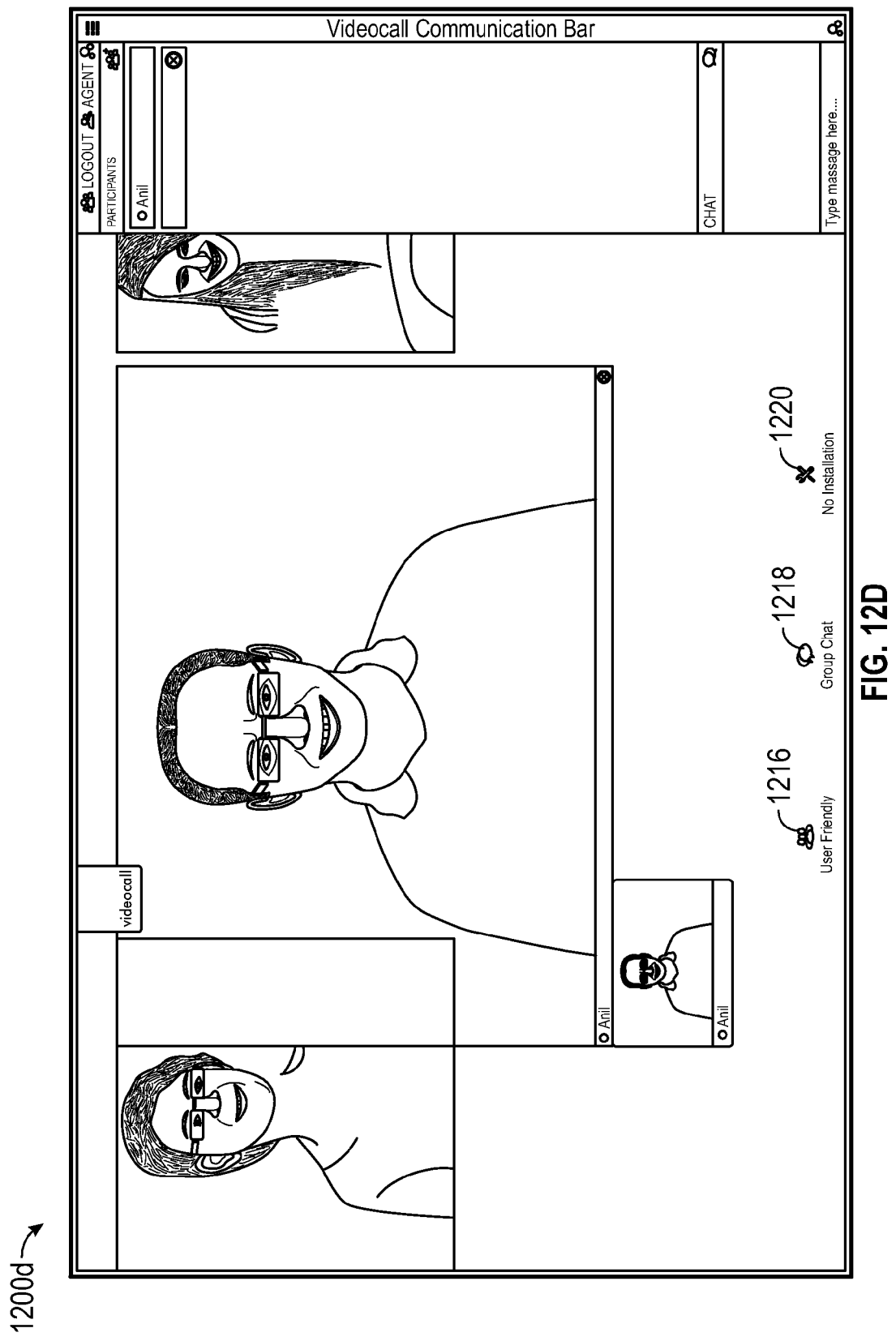

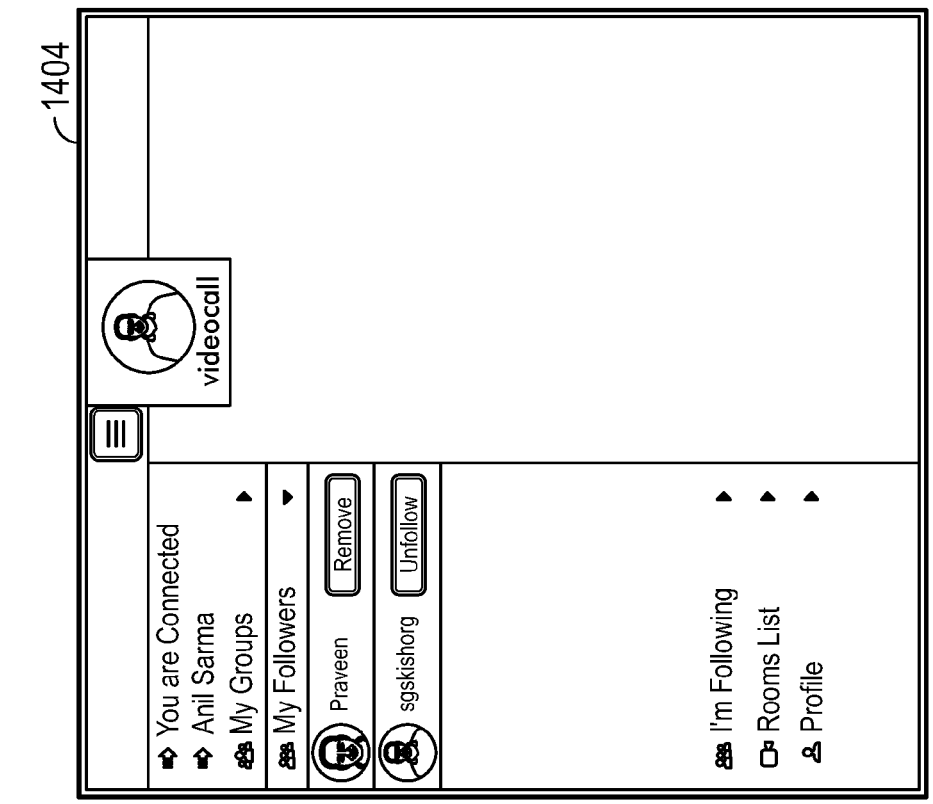
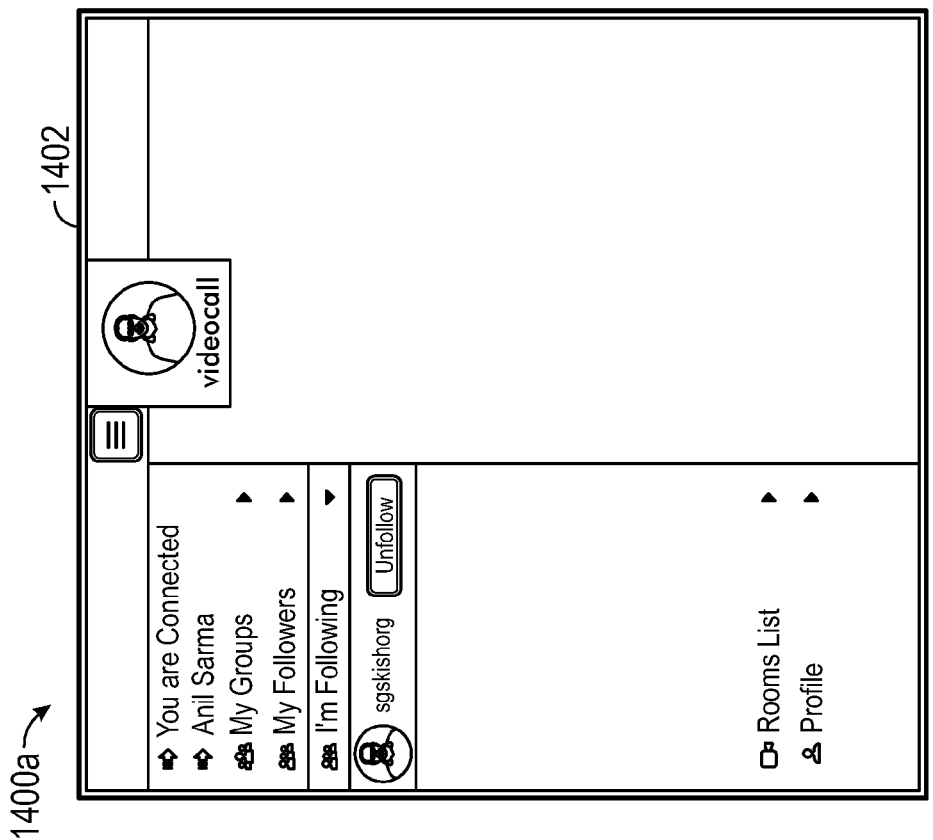
FIG. 14A
FIG. 14B

SYSTEM AND METHOD FOR VIDEO COMMUNICATION

TECHNICAL FIELD

The present disclosure relates to the field of video call communication systems. More particularly, the present disclosure relates to establishing video call and providing personalized video call identity.

BACKGROUND

Recent advancements in the information technology sector have made available a variety of types of communication modes that are operable to establish one-to-one and/or many-to-one and/or one-to-many interactions between users of information technology devices. These communication modes, for example, can be referred to as voice call, video call, chatting, messaging, and the like.

In order to have a personal interaction a user may choose one of the above referenced communication modes and initiate a discussion. In accordance with known prior art, in order to initiate a video call a user needs to have an account created with one of the available proprietary communication sources, such as Skype™, Google Hangouts™, Facebook™, or other similar web based or mobile applications for communications between users of computers and/or other mobile devices.

Typically, a website of a company or an organization offering such communication services will: (a) provide contact details that facilitate contact by a visitor to the website with a representative of the company or organization; (b) collect required contact details; and (c) advertise or otherwise provide information about the services or products offered by the company. The contact details collected by the company are generally limited to contact number, chat-id, interactive voice response and the like. Such details are not helpful for the visitor to visually identity the representative with whom the visitor is having an in-person interaction.

Other limitations of these proprietary sources is that they cannot be used by a user as a personalized video identity which would enable a user's followers, fans, or other affiliates to identify the user, initiate an instant video call with the user, and/or join and participate in a video call with the user (and potentially other followers, fans and/or affiliates of the user as well).

Several patent documents disclose prior art communication systems including the following:

U.S. Pat. No. 8,248,446 filed on Jul. 6, 2007 discloses a dial URL that when activated in a user's web browser will request that a managing tool determine an available calling route between a user's preferred end-point and the end-point being addressed in the URL with the required resources, and that the managing tool then schedule the resources and initiate the call between end-points. This invention is intended to set-up the route and resources prior to the initiation of a call, and indeed the call will not be initiated until the route and resources are determined. Thus, this invention does not disclose a system operable to conduct a video call which one or more parties can join after the call is initiated on the fly.

U.S. Patent Application Publication No. 2008/0178234 filed on Dec. 4, 2007 discloses a hosting a network site on a computer network and displaying links to one or more videos on the network site. This application does not disclose the facilitation of real time video communication, the application discloses a method of providing access to pre-recorded video content.

U.S. Patent Application Publication No. 2009/0259940 filed on Sep. 23, 2008 discloses a tool that enables an unsophisticated user who does not have any programming technology knowledge to develop and deploy a video application for use on a mobile device. This application may be operable to accept a video call, but this operation is solely for the purpose of receiving instructions to provide particular media to the caller, or to determine that the call should be ended. This patent application does not disclose a system operable to initiate a video call in which two or more parties will participate, and that can be initiated by one or more parties.

U.S. Pat. No. 8,700,714 filed on Dec. 6, 2007 discloses a system operable for video content to be provided as a video stream, and for users to select video content from the video stream for viewing. Users in a stream community can interact by chatting by exchanging written text messages while viewing video content. This patent does not disclose a system for video calling with between two or more parties in real time.

U.S. Pat. No. 8,371,180 filed on Jul. 30, 2010 discloses an apparatus for creating video collaboration between a customer at a point of inquiry and an expert located off-site. This apparatus is operable to allow parties at two locations to be in face-to-face video contact, it does not permit parties at multiple locations to be in face-to-face video contact simultaneously in real time.

U.S. Patent Application Publication No. 2013/0339159 filed on Dec. 26, 2012 discloses a system operable for two users to share data on each user's respective computer environment and to video chat during such sharing of data. The functions of this invention are implemented by a computing device that each of the users must be connected to in order to engage in the video chat. This application does not disclose two or more users engaging in a video call that does not require all users to connect to a single computing device.

U.S. Patent Application Publication No. 2014/0168344 filed on Jan. 31, 2014 discloses a tool for capturing video mail and for processing and distributing video mail. In accordance with this invention video mail is recorded if a second video caller whom a first video caller is trying to reach is not available. This invention therefore does not involve real time video calling between a first caller and a second caller, it is directed to recording video content of a first caller and making this available to a second caller at a later point in time.

U.S. Patent Application Publication No. 2014/0041055 filed on Aug. 6, 2012 discloses a system to control access by a user to an online service. This application requires that all users be classified as malicious or non-malicious.

U.S. Patent Application Publication No. 2005/0102358 filed on Nov. 9, 2004 discloses a system for a method of managing Internet-based communities on the Internet through standard web pages without any requirement for the installation of additional software on either a user's computer or on websites where the system is implemented. The system permits visitors to a registered web page to initiate and participate in anonymous ad hoc chat sessions, and for members of Internet-based communities to message other members. This prior art does not disclose real time video calling between two or more persons.

Additional patent documents that represent prior art in the field of online communications include the following: PCT Application Publication No. WO2014099819; PCT Application Publication No. WO2009146293, filed on May 22, 2009; U.S. Patent Application Publication No. 2013/0166382, filed on Feb. 21, 2013; U.S. Patent Application Publication No. 2013/0179494, filed on Aug. 24, 2012; U.S. Patent Application Publication No. 2007/0220092, filed on Feb. 13, 2007; U.S. Pat. No. 8,191,001, issued on May 29, 2012; U.S. Pat.

No. 8,145,659, issued on Mar. 27, 2012; U.S. Patent Application Publication No. 2005/0288951, filed on May 13, 2005; U.S. Pat. No. 7,885,913, issued on Feb. 8, 2011; U.S. Pat. No. 7,822,821, issued on Oct. 26, 2010; U.S. Pat. No. 8,667,072, issued on Mar. 4, 2014; U.S. Pat. No. 8,612,360, issued on Dec. 17, 2013; U.S. Patent Application Publication No. 2013/0174038, filed on Jan. 4, 2012; U.S. Patent Application Publication No. 2014/0013230, filed on Jul. 8, 2013; U.S. Patent Application Publication No. 2008/0178234, filed on Dec. 4, 2007; U.S. Patent Application Publication No. 2014/0118474, filed on Oct. 25, 2013; PCT Application Publication No. WO2012096794, filed on Dec. 31, 2011; U.S. Pat. No. 8,548,978, issued on Oct. 1, 2013; U.S. Pat. No. 8,682,809, issued on Mar. 25, 2014; U.S. Pat. No. 8,745,647, issued on Jun. 3, 2014; U.S. Pat. No. 8,671,089, issued on Mar. 11, 2014; PCT Application Publication No. WO2014089686, filed on Jun. 12, 2013; U.S. Pat. No. 8,558,863, issued on Oct. 15, 2013; U.S. Pat. No. 6,909,708, issued on Jun. 21, 2005; U.S. Pat. No. 8,181,218, issued on May 15, 2012; PCT Application Publication No. WO2001067760, filed on Mar. 9, 2001; U.S. Pat. No. 7,835,509, issued on Nov. 16, 2010; U.S. Pat. No. 6,898,620, issued on May 24, 2005; U.S. Pat. No. 5,758,079, issued on May 26, 1998; U.S. Pat. No. 7,185,054, issued on Feb. 27, 2007; U.S. Pat. No. 7,433,921, issued on Oct. 7, 2008; U.S. Pat. No. 8,730,296, issued on May 20, 2014; European Patent Application Publication No. EP2460127, filed on Jul. 27, 2010; Canadian Patent No. 2,157,895, issued on May 18, 2004; U.S. Pat. No. 8,063,929, issued on Nov. 22, 2011; U.S. Pat. No. 6,789,105, issued on Sep. 7, 2004; U.S. Patent Application Publication No. 2012/0066355, filed on Sep. 14, 2011 (issued as U.S. Pat. No. 8,838,696 on Sep. 16, 2014); U.S. Patent Application Publication No. 2010/0306317, filed on May 27, 2009 (issued as U.S. Pat. No. 8,819,132 on Aug. 26, 2014); Canadian Patent No. 2,296,182, issued on Dec. 19, 2000; U.S. Pat. No. 6,665,395, issued on Dec. 16, 2003; U.S. Patent Application Publication No. 2013/0127983, filed on Jan. 29, 2013; U.S. Patent Application Publication No. 2012/0120270, filed on Nov. 15, 2010; U.S. Patent Application Publication No. 2013/0039433, filed on Oct. 15, 2012; U.S. Pat. No. 8,514,842, issued on Aug. 20, 2013; and U.S. Patent Application Publication No. 2011/0080460, filed on Feb. 24, 2010.

BRIEF SUMMARY

In one aspect, the present disclosure relates to a video call system operable from a webpage, comprising: a webpage; a video call enabling code generating unit operable receive information inputted into the webpage and to generate a video call enabling code utilize said inputted information and link said video call enabling code to the webpage; a video call enabling option operable from the webpage that is operable to run the video call enabling code upon selection of the video call enabling option; and a video call system operable generate a video call between the user of the webpage and one or more other participants.

In another aspect, the present disclosure relates to the video call system operable from a webpage wherein the inputted information incorporates the domain name address of the webpage.

In another aspect, the present disclosure relates to the video call system operable from a webpage wherein the webpage is connected to the Internet, and is operable to send messages to one or more persons via the Internet prior to and during the video call.

In another aspect, the present disclosure relates to the video call system operable from a webpage wherein the video call system is operable to join one or more additional participants to the video call during the video call.

In yet another aspect, the present disclosure relates to a video call method, comprising the steps of: receiving a request for a video call enabling code for a respective website from a website user; generating the video call enabling code comprising a video call enabling key for the respective website; and copying the video call enabling code in the respective website for generating a video call initiating option on the respective website; and whereby a selection of video call initiating option on the respective website by a visitor enables initiating a video call.

In another aspect, the present disclosure relates to the video call method further comprising a step of enabling the visitor to transmit one or invitations to one or more other users to join the video call.

In another aspect, the present disclosure relates to the video call method further comprising a step of displaying the video call initiating option as a sidebar on the respective website. further comprising a step enabling the visitor to complete a registration process on selecting the video call initiating option on the respective website.

In another aspect, the present disclosure relates to the video call method further comprising a step of enabling the visitor to create a personalized profile page in response to completing the registration process.

In another aspect, the present disclosure relates to the video call method wherein the website user is enabled to delete one or more invitees from the video conference during the continuation of video conference.

In still another aspect, the present disclosure relates to a video call system comprising: one or more devices connected to a network; a user registration unit operable operable to receiving information inputted by a user of the one or more devices; an application programming interface with socket operable to receiving a video call request inputted by a user of one or the more devices; a video call session establishing and creating a unit connected to the application programming interface with socket and operable to create and establish a video call session; and a data repository unit operable to store data; and whereby a video call can be created and established between two or more users of the one or more devices.

In another aspect, the present disclosure relates to the video call system wherein a video call recording unit is operable to record the video call.

In another aspect, the present disclosure relates to the video call system wherein a initiating user who initiates the video call operates the system to limit the participation of at least one of the one or more users engaged in the video call.

In another aspect, the present disclosure relates to the video call system wherein a video call recording unit is operable to record the video call as a video call file and the video call recording unit is connected to the data repository unit and the video call file is storable in the data repository unit.

In another aspect, the present disclosure relates to the video call system wherein an identify verification unit is operable to utilize registration information inputted by a user to verify the identity of said user.

In another aspect, the present disclosure relates to the video call system wherein a video profile page managing unit is operable to create a profile page for the one or more users.

In another aspect, the present disclosure relates to the video call system wherein a video call can be initiated from the profile page.

In another aspect, the present disclosure relates to the video call system wherein the video call session establishing and creating unit is operable to create and establish a video call as a private call or a public call.

In addition, the present disclosure relates to embodiments of the present disclosure directed towards system for establishing video call and providing personalized video call identity and methods employed therefor.

In addition, the present disclosure relates to exemplary objective of the present disclosure that is to provide a video call enabling option on any website whereby a visitor to the website is enabled to initiate a video call.

In addition, the present disclosure relates to another exemplary objective of the present disclosure that is to provide a personalized video account for a user and a personalized video profile page whereby the user is identifiable by a video call identifier, so that follower, fans and/or other affiliates or associates of the user can initiate a call with the user, join a call with the user, and/or participate in a call with the user.

In addition, the present disclosure relates to another exemplary objective of the present disclosure that is to enable a user to record and share a video call in which the user is engaged.

In addition, the present disclosure relates to a method that includes receiving a request for a video call enabling code for a respective website from a website user, generating the video call enabling code comprising a video call enabling key for the respective website, and copying the video call enabling code in the respective website for generating a video call initiating option on the respective website, whereby a selection of video call initiating option on the respective website by a visitor enables initiating a video call.

In addition, the present disclosure relates to a method that includes receiving request of a user for creating a personalized video profile page, whereby the user enabled to provide registration credentials to create a personalized video account associated with the personalized video profile page identifiable by a video call identifier.

In addition, the present disclosure relates to a system comprising one or more units is provided. The one or more units are configured to perform the functions and operations associated with the above-disclosed methods.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF DRAWINGS

The invention will be better understood and objects of the invention will become apparent when consideration is given to the following detailed description thereof. The drawings described herein are for illustration purposes only and are not intended to limit the scope of the present disclosure in anyway. Other objects and advantages of the present invention will become apparent to those skilled in the art upon reading the following detailed description of the preferred embodiments, in conjunction with the accompanying drawings. Such description makes reference to the annexed drawings wherein:

FIG. 12D is a view of a webpage showing a maximized page view captured while the video call is in progress that is an embodiment of the present invention.

FIG. 14A is a view of webpage showing information about participants that are being followed by a user on the video profile page of the user, that is an embodiment of the present invention.

FIG. 14B is a view of webpage showing information about followers of a user on the video profile page of the user, that is an embodiment of the present invention.

Figure 1:
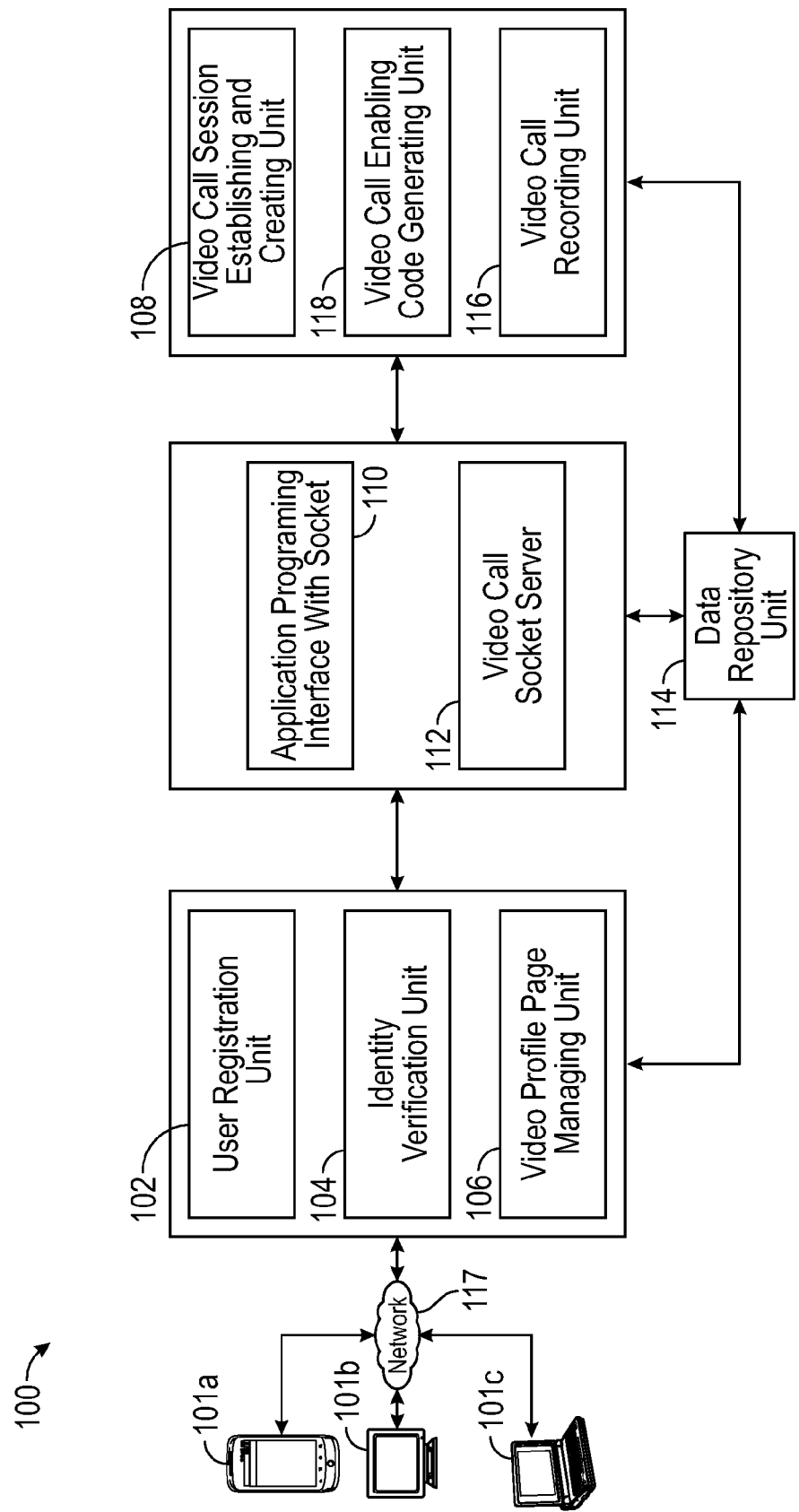
FIG. 1 is a system diagram showing an establishing video call that is an embodiment of the present invention.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF EXAMPLE EMBODIMENTS

The present invention is a method and system for establishing a video call between two or more persons through two or more computer devices and/or mobile devices. The present invention can be utilized to enable any website to be video call enabled, so that a video call can be initiated from any website. During the call the present invention may recognize words, phrases, key topics or other content of the video call discussion in real time or virtually real time, and disseminate such information to the participants in the call as well as to other followers, friends or other affiliates of persons engaged in the video call.

The use of "including", "comprising" or "having" and variations thereof herein is utilized to encompass the items listed thereafter and equivalents thereof as well as additional items. The terms "a" and "an" herein do not denote a limitation of quantity, but rather denote the presence of at least one of the referenced item. The use of "video call" references all forms of video communications generally, and can include audio, visual, drawing, typing and other types of content.

Generally herein the term "user" used in reference to participation in a video call is used to indicate the person who initiates the video call, whereas the term "participant" is used to indicate a person who participates in a video call. A user may also be a participant to the video call, as a user participates in a video call. However, the user who initiates the video call may have capabilities that are not achievable by all participants to a video call.

Generally herein the terms "call" and "video call" are used interchangeably.

The video call of the present invention occurs in realtime or virtually real time. A video call of the present invention can be joined while in progress by additional participants. The use who initiates the video call may control aspects of the participation of the participants engaged in the call. The present invention is operable to provide personalized video call identity, and this identity can be utilized by follower, friends, or other affiliates to identify a person who is initiating, or engaging in a video call.

Participants of the video call can receive a copy of the video call upon request following the termination of the video call. In some embodiments of the present invention, a copy of the video call will not be saved or stored unless any participant requests that a copy of the video call be sent to such participant after the call terminates. In this manner the privacy of the video call may be protected, as no copy of the video call will be stored on any server or other storage location of the video call system that may be accessed by any third party after the call has terminated, unless a participant of the call requests that a copy be sent directly to that participant.

The present invention is operable to enable a video call to be initiated from any website. The present invention may enable any website so that a video call can be initiated from such website by embedding or otherwise integrating a video call link or other connection to the system of the present invention. In such an embodiment of the present invention, a video call option, such as a button or sidebar, is accessible from the website, so that a user can initiate a video call from the website. For example, a company or other organization may utilize the present invention to initiate a video call from its website, so that a customer can participate in a video call with one or more members of the organization's staff. A skilled reader will recognize that there are a variety of advantages to having a video call option available from a website. It is the system of the present invention that will operate the video call, and in this manner the organization does not require the creation of its own video call system into its website, nor does it require a customer to leave its website to initiate a video call, which can be disruptive to the flow of a customer's activities. The present invention operates so that a video call can be initiated directly from any website.

To cause any website to be video call enabled, a request for a video call enabling code for a respective website will be sent to the system by a website user. Once the request is received the steps to enable a website for video calls to be initiated from that website include: generating the video call enabling code comprising a video call enabling key for the respective website, and copying the video call enabling code in the respective website for generating a video call initiating option on the respective website, whereby a selection of video call initiating option on the respective website by a visitor enables initiating a video call. As discussed herein there are other possible embodiments of the present invention and the steps for enabling a website for the initiation of video calls from that website may vary in these embodiments.

As another example, a video call can be initiated from a website that is created for the purpose of running the system of the present invention. A participant to such a website can login to the website and initiate a video call that will be operated by the system of the present invention. From such a website the participant can choose to initiate the video call from any page of the website, including a personalized profile page. A personalized profile page is a webpage that provides details relating to a specific participant, including a list of the participant's followers, a list of recent video calls in which the participant has participated, a list of favorite video calls, and other personalized information pertaining to the participant.

A participant who initiates a video call, whether from a remote website, or a website dedicated to running the system of the present invention, may be provided by the system with tools to assist with a discussion between participants in a video call. For example, it may be possible for a whiteboard to be provided to the participants in a video call. In such an embodiment of the present invention, the whiteboard may be utilized by the user who initiated the video call, all participants in the video call, or select participants in the video call. The whiteboard may be utilized to be written upon, or drawn upon, and to thereby display information that supports or enhances the discussion that is engaged in by the participants to the video call. The content of the whiteboard may be captured and copied during and/or upon termination of the video call, at the request of a participant of the video call.

A skilled reader will recognize that other tools may be provided by the system of the present invention to participants in video calls for the purpose of enhancing or supporting the video call and the discussion of the participants during the video call. For example, one or more of the following tools may be available for use during a video call by one or more participants of a video call: a white board; screen sharing; document presentations (such as in a power point or other presentation format); file sharing; video sharing; and instant messaging.

The present invention may also be provided in a software application ("app") form that is operable from a mobile device. An app version of the present invention will provide all of the functions and features described herein.

The present invention differs from and offers benefits over prior art systems and methods for video call communication. Prior art for video communication generally requires a user to either login to a video provider's website, or download the video call provider's software app onto the user's mobile device. Once the user is signed-up the user can initiate a video call while signed onto the video call provider's website or app. Thus, prior art systems and methods require for a video call to be initiated from and ultimately through the video call provider's website or app. The present invention is operable so that any website can be enabled to allow for a video call to be initiated from any website, not only directly through the website or app of the video call system provider.

The present invention offers a benefit over the prior art in that a user can initiate a video call from a personalized webpage of that user. In this manner, the user may be readily identifiable by other participants in the video call and the user may have information pertaining to video call use and participation displayed to the participant during a video call. A skilled reader will recognize that this aspect of the present invention can be beneficial in several situations.

Once a video call is initiated the user who initiated the call can push out information about the participation of the user in the call to others, including people not engaged in the video call. For example, the user can push out information that the user is engaged in a video call by email, text, tweet, page, or any other electronic communication. This activity of pushing information can be operated from a personalized profile page, or from any other webpage from which the participant is participating in the video call. Furthermore, the user who initiated the video call can push information, and any other participant in the video call can also push information. Prior art systems generally do not allow a user who initiated a call from a video call provider's website or app, or any other participant engaged in the call, to easily push out information about the call to other persons during the call through the video call system. Thus, this aspect of the present invention offers a benefit over the prior art. For example, information about the user's participation in the video call may be pushed out to friends, followers (such as Twitter™ followers), Internet group members, affiliates or other persons affiliated with the user/participant. The push out of information about the video call may be automatically sent to one or more pre-designated persons or groups of people, or to one or more persons or groups of people selected by the user prior to or during the call.

The information that is pushed out to such persons may include details about the topic being discussed during the call. Embodiments of the present invention may be operable to recognize key words, phrases, or other content of the video call. This recognition tool may be utilized to generate information about the content of the call. Thus, the information pushed out from the user may indicate the topic or other content of the call, which may be of interest to persons to whom information about the call is pushed out. Moreover, the information about the topic or content of the call may be pushed out in real time or virtually real time, so that a potential participant or other person receiving such information will be aware of the current topic or content of the discussion of the video call. In some embodiments of the present invention, the information that is pushed out will be generated by the system and will be pushed out at intervals automatically by the system during a call. The use of this option may be controlled by a user/participant.

The information that is pushed out to any person or group or people may further include an invitation to join the call. Joining the call may involve either full participation in the call, or limited participation in the call. For example, full participation in the call may facilitate the participant joining the call to engage fully in the audio and visual aspects of the call. Whereas, limited participation in the call may involve a participant joining the call and be limited to only engaging in video or audio participation in the call. For example, a participant with limited participation abilities may only be able to view and hear the call, but cannot be heard audibly and/or viewed by others on the call. A skilled reader will recognize that there are many options whereby a participant can have limited participation on a call. Any limits on participation may indicated when a participant is invited to join the call, or can be imposed on a participant during a call. All limitations on the participation of a participant to the video call are set by the user who initiated the video call, either prior to the video call or during the video call.

For example, a user who initiates a video call can control what one or more of the participants can do during a video call. A user can control whether a participant has access to an audio only feed, or a video and audio feed. A user can also control whether a participant can view a whiteboard, as well as whether a participant can write or draw on the whiteboard. A user can control whether a participant has an option to record a video call in which the participant is involved. A user can further control whether a participant can invite anyone else to join the video call. However, if a user permits a participant to invite one or more other persons to join the video call, then the participant is granted the right to set limitations on the participation of such persons on the video call, in the same manner as the user has control over the participation of the participant in the video call.

In embodiments of the present invention, the voice of a participant to a video call, or other sound components during a call, may be recorded through a microphone or other recording device of the device that a participant is utilizing to participate in a video call, or any external recording device linked thereto. It is also possible that audio input to the video call may be provided from any audio file available on the device that a participant is using to engage in the video call, or from any text component that is translated to voice output. The video caller may further be viewable through the operation of a web-camera of the device that the participant is utilizing to participate in the video call, or any external camera linked thereto.

To exemplify still another benefit, it is notable that the prior art solely permits persons who are chosen by the user who initiates the call to participate in a video call. The present invention may allow participation in the call by persons who are not explicitly invited by a participant in the video call to participate in the call.

The user may choose whether a video call initiated by the user will be a private or open call. If the call is to be a private call the user will personally invite participants to join the call.

If the call is an open call, then everyone who is following the user will have the option to join the call, as will persons who the user invites to join the call. The user's followers and invitees will have the option to join the call at the start of the call or at any point during the call. Persons who are followers or invitees of other participants engaged in the video call other than the user may also join the call in the same manner as the user's followers and invitees. Moreover, followers of the participants to the call may also join the call without any direct invitation. Other persons who are not followers of the user or other participants, including guests who are not signed-up with the video call provider, may also join an open video call.

As an example of an open video call, a government official may initiate an open call to provide information to constituents. All of the official's followers, as well as other participants, including guests, may join the call. The official may set the participation of the participants to be listen/watch only, so that the participants cannot be heard audibly on the call themselves, but can only watch and listen to the official.

As an example of a private video call, a user can set-up a call to discuss a particular topic, such as a topic from the headlines/trends found in the user's news feeds, and the participants to the call may be limited to only participants who are directly invited by the user. Another example of a private call may be a video call that involves participants who are all members of an organization, and the video call may be for the purpose of having a meeting involving those specific persons from the organization. It is possible that the meeting may require discussion and presentations that are not possible through a conference call, but can be shown through a video call. However, the participants may be required to be a specific, select group of people, and therefore non-invitees will not be able to join the private video call.

Prior art video call providers generally store a copy of the video call after the call is terminated. An embodiment of the present invention can be set so that a copy of the video call is not saved unless a participant requests that a copy be sent to that participant. This creates several benefits over the prior art. For example, there is no data footprint created by the video call, unless a copy of the video call is requested by a participant. As another example, as any copy of the video call may be sent directly to a participant of the call in an embodiment of the present invention, it will be the participant's responsibility to store the copy of the video call securely, the system will not store a copy of the video call once the copy is sent to the participant(s) who requested a copy.

In an embodiment of the present invention, the copy of the video call may be sent directly to the external storage that is indicated by the participant who requests a copy of the video call. The copy of the video call is therefore not sent via email, or any other communication that will be stored for a period of time and may be insecure, and that may require an additional copy of the video call to be made from the copy embedded in the communication in order for the video call to be stored by the participant recipient. Instead, the present invention is operable so that the copy of the video call is transferred directly to the electronic storage indicated by the participant.

Another benefit of the present invention over the prior art is that the prior art systems and methods for video communication require plug-ins to function, whereas the present invention does not require any plug-in to function and can therefore be operated from any website.

Herein, there are some examples of embodiments of the present invention. A skilled reader will recognize that the present invention has a variety of possible embodiments, as well as a variety of possible applications to private and business environments and users. The examples herein are provided merely as a means of describing aspects of the present invention.

Enabling a Website to Initiate a Video Call

As discussed herein, an embodiment of the present invention is operable to enable a video call to be engaged in from any website, including any third party website. Such a website will have an option accessible from the website whereby a video call scribe can be instructed to run. A video call enabling code generation process of an embodiment of the present invention may involve the video call enabling code generating unit generating a video call script. The video call script is run when the video call initiating option is selected by a user or visitor to a website or profile having the video call initiating option embedded therein or otherwise accessible therefrom. The video call initiating option may be displayed as a side bar, or in another format on the website.

Figure 2:
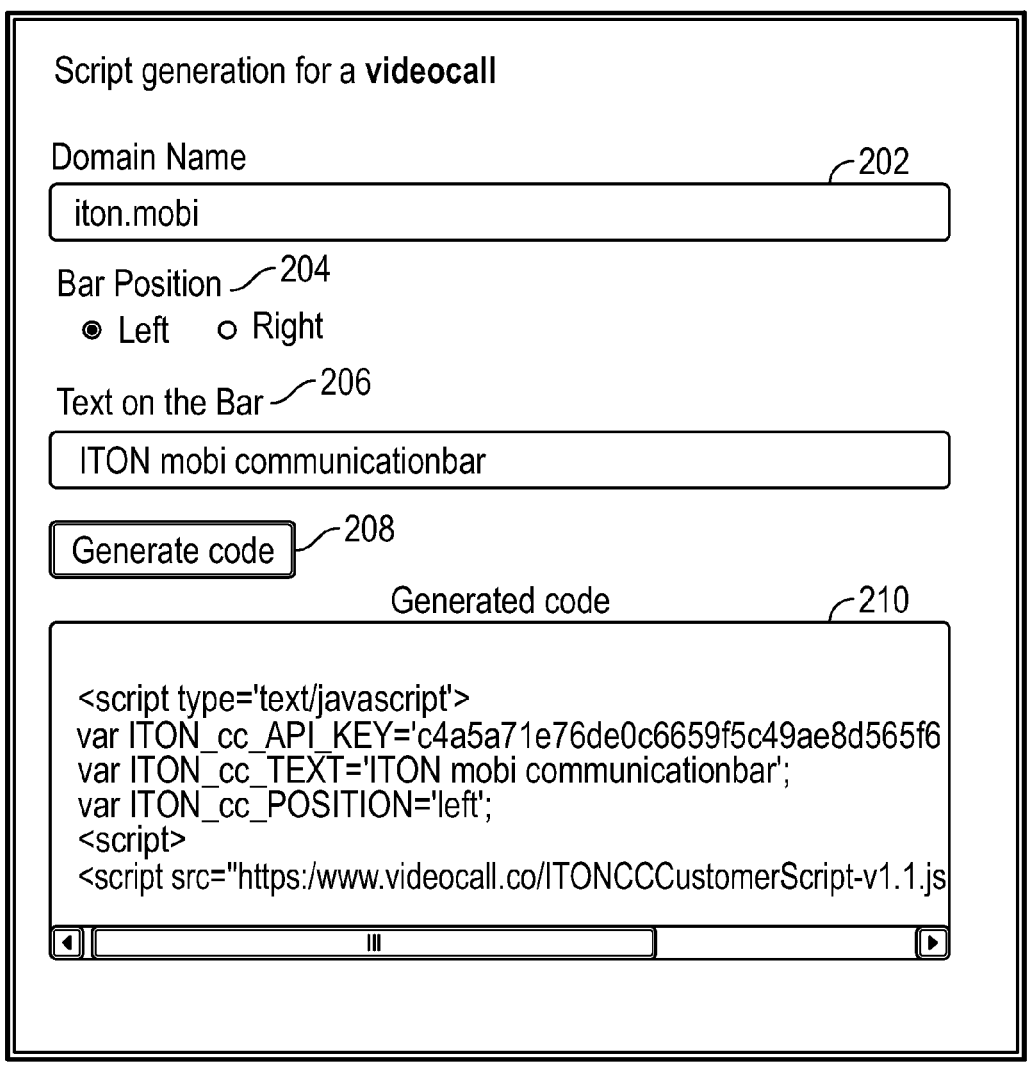
FIG. 2 is a screen shot showing an example of a video call enabling code generation process, of an embodiment of the present invention.

The user may be directed towards a script generation page 200 which functions to generate video call enabling code, as shown in FIG. 2. The script generation page may be accessible from a webpage in the video call provider's site. A user can input information into the script generation page, such as into a domain name field 202 whereby a domain name of the website where the video call initiating option is to be embedded or otherwise made available can be entered by the user. The domain name is recognized by the system as a uniform resource locator for the website where the video call initiating option is to be embedded or otherwise made available. The script generation page also provides a side bar position field 204 whereby a user can input the position where the video call initiating option will be embedded or otherwise made available upon the indicated webpage.

The user may also input into the video call enabling code generation page any text to appear on the web site with, near or in the video call initiating option in the bar field 206. Further the website user may be enabled to select a generate code button 208 that will cause the video call enabling code to generate and be displayed to the user in a display block 210. The generated video call enabling code will dictate the format of the display of the video call initiating option upon the website. For example, the video call initiating option may be displayed as a sidebar on the webpage, as a button, or in any other format.

When the generated video call enabling code is generated a video call enabling key may also be generated that is associated with the generated video call enabling code. The video call enabling key may be utilized by the system to restrict the usage of the generated video call enabling code to the web site wherein the generated video call enabling code is to be embedded or otherwise accessible. For example, should the generated video call enabling code be generated for use with Website A the video call enabling key will recognize that the generated video call enabling code is generated for use with website A. Therefore, should the generated video call enabling code for Website A be embedded or otherwise be accessible from another website, such as Website B, the video call enabling key will recognize that the generated video call enabling code for Website A is being accessed from a website that is not Website A, and the video call enabling key will restrict use of the generated video call enabling code for Website A from a website that is not Website A.

As the video call enabling code is generated to incorporate the website information (e.g., domain name) of the authorized website from which the video call system is to be enabled to ru, should the generated code be deployed from another website, the system would recognize when the code is run that the site information incorporated in the video call enabling code does not correspond with the website from which the code is being run. The result of this recognition will be that the code cannot be run to initiate a video call from the website that does not correspond with the website information incorporated in the code. The use of video call enabling code is restricted to the website that is identified in the code.

When a video call is initiated from a third party website, the user who is selecting the option available to initiate a video call does not necessarily have to sign-in or be invited to engage in a video call. The operator of the third party website may indicate how it would like the system to run when it is run from that website. For example, if the option to initiate a video call is offered from a company website, the company may want all video calls initiated from its site by users to cause the user to connect in a video call with employees of the company. As another example, a video call that is initiated from an option to initiate a video call from a government website may allow a user to join a video call that is already in session that is originally initiated by a government official. As discussed herein, the participation of the participant joining the call may be limited in some instances. A skilled reader will recognize the variety of options for how the system may run when it is engaged from a video call enabling code accessible from a third party website.

Once a user has submitted a request for a video call to the system a video call enabling code generating unit 118 may be utilized in a third party website to initiate and sustain a video call. The video call enabling code generating unit generates a video call enabling option that may be embedded in, or otherwise operable from, a website to initiate a video call. Such website where the video call enabling option is embedded or operable may be indicated by a user of a website during the request stage.

In some embodiments of the present invention, a visitor to a website may utilize a video call enabling option that is already available on said website to initiate a video call. For example, the video call initiating option may be displayed as a sidebar on the respective website. The visitor to the website may be prompted to submit the request through the user request unit in the manner discussed herein upon selecting the video call enabling option to initiate a video call. To make a video call enabling option accessible within a website a prior user must have requested such accessibility in a manner described herein.

As an example, a website that offers a service may have a video call enabling option embedded in the website so that if a visitor to the website is interested in communicating with a representative of the organization providing services through the website such visitor can select the video call enabling option in the website to discuss the services with the representative (or multiple representatives may participate in the video call). The representative(s) and visitor to website may discuss topics such as the details of the services and pricing of the services during the video call. The visitor will initiate the video call by selecting the video call enabling option, which may be displayed in the website in may forms, for example, such as a sidebar on the respective website.

In an embodiment of the present invention, in response to a visitor initiating the video call, the system may determine the video call request details of the visitor and establish a video call by routing the call to the available representative. The details of the visitor may include the visitor's email address, the visitor's name and the visitor's phone number. The details of the visitor may be inputted by the visitor, or the system may obtain details relating to the visitor from other sources, such as Facebook™, Twitter™, or any other source where details relating to the visitor are made available.

The system may further be operable so that the visitor can transmit invitations to join the video call to other persons who may be friends of the visitor, followers of the visitor, other visitors to the website, or other persons with whom the user can communicate electronically. Similarly, the representative may also transmit invitations to other representatives to participate in the video call.

Figure 3A:
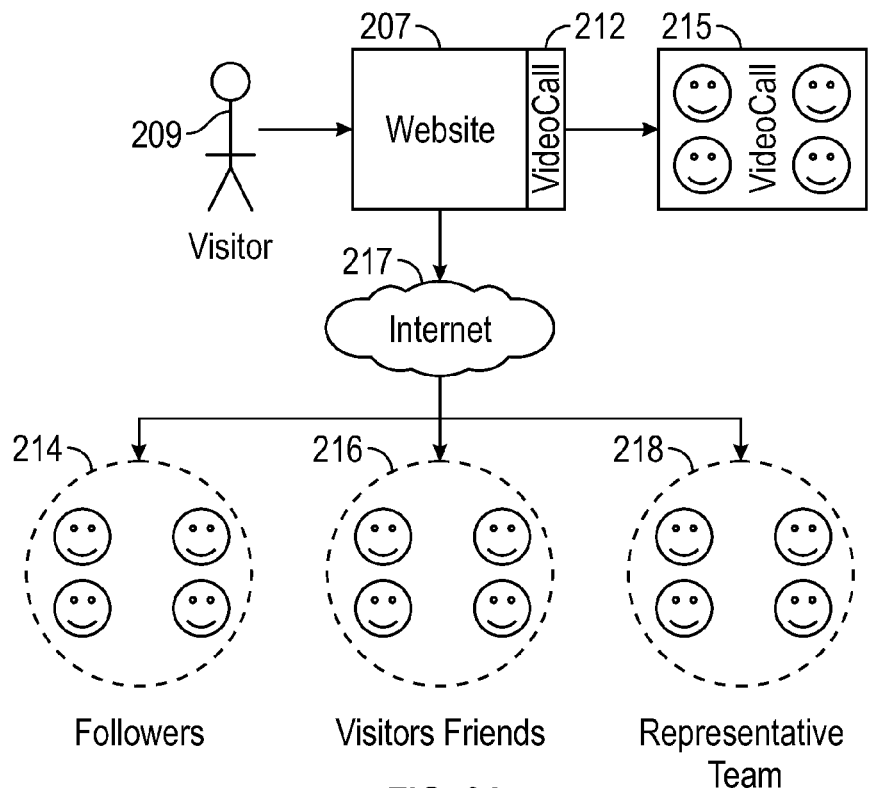
FIG. 3A is a system diagram showing a system for initiating a video call as a sidebar on a webpage from which the video call is initiated by a visitor to said webpage, that is an embodiment of the present invention.

As shown in FIG. 3A, in one embodiment of the present invention, that is a website visitor initiated web call system, a visitor 209 accesses a website 207 that has a video call initiating option 212 embedded or otherwise accessible from said website. By selecting the video call initiating option the user can initiate a video call 215 with one or more other persons. The visitor may choose the people who will be allowed to participate in the call or the one or more persons with whom the call will be initiated may be selected by the system in accordance with system parameters. The parameters may be set in accordance with the type of website. For example, a company website whereby a visitor can obtain information regarding a product or service may cause the call to be initiated with one or more company representatives. As another example, the call may be set to involve members of a particular group, such as persons with a common interest that have joined a common group. A skilled reader will recognize the variety of types of groups and parameters that the system may utilize to initiate a call between a visitor and one or more other persons.

During the video call the visitor may invite other persons to join the call and to participate in the call either fully, or with some limitations. The visitor sends such invitations via the Internet 217, or some other network connection between the website and other persons whose contact information is known to the visitor. For example, the visitor may invite one or more of the visitor's follower's 214, one or more of the visitor's friends 216, other members of a team of representatives 218 related to the website, or one or more other people whose contact information is known to the visitor, to join the video call.

Should one of the people engaged in the video call 215 be a representative related to website, such representative may also invite one or more members of the representative team 218 (e.g., agents, sales, support, or other members of the representative team) to participate in the video call. The invitation from the representative engaged in the video call to one or more other representatives will be directed from the video call through the Internet connection to one or more members of the representative team.

Figure 6A:
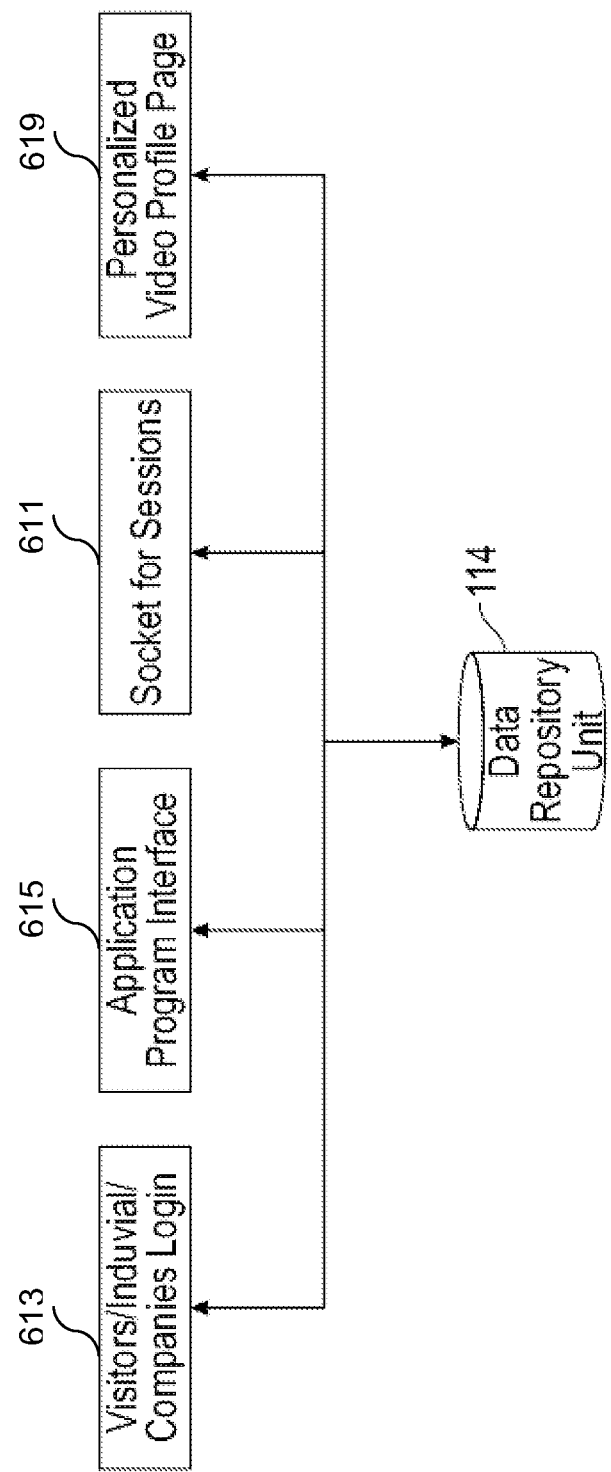
FIG. 6A is a system diagram showing the system elements utilized for a video call sessions, that is an embodiment of the present invention.
Figure 6B:
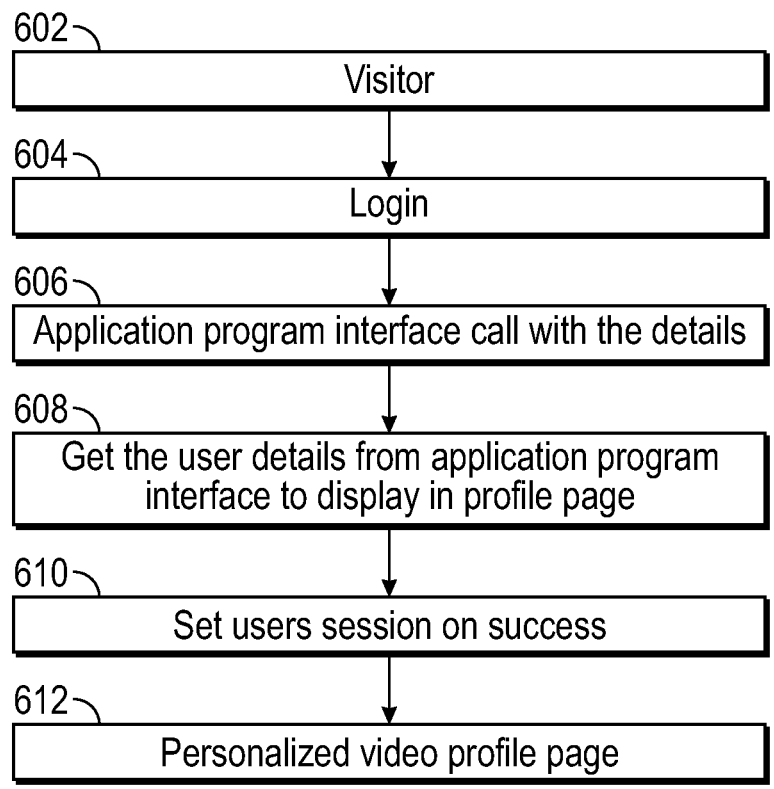
FIG. 6B is a flowchart of steps for a visitor login to the system, in an embodiment of the present invention.

An option for utilizing a video call enabling option to initiate a video call is provided to a visitor to a website, is shown in FIG. 6B, that utilizes the system elements shown in FIG. 6A. A visitor may access the website of a person or an organization that has a voice call enabling option embedded therein or accessible therefrom. Specifically a video call may be initiated by the visitor from such a website for the purpose of the visitor speaking with either the person whose website the visitor has accessed or a representative of the organization whose website the visitor has accessed, for the purpose of discussing a topic related to the website content, or issues pertaining to the person or organization whose website the visitor is visiting. An example of a visitor visiting the website of a particular company and requesting a video call by utilizing the video call enabling option embedded in such website (or available via such website) is shown in FIG. 6B. In this embodiment of the present invention a company video call method may be initiated. In some cases a visitor may need to access a company website 602 and login to the company website 604 in order to visit the company's website. The login may occur through a visitors/individual/companies login 613 tool on the system. Once logged in or otherwise having gained access to the company's website, the visitor may select the video call enabling option from the company's website and thereby request a video call.

Upon receipt of such a request by the visitor the system may initiate an application program interface call, and details relating to the visitor (for example, such as details provided by the visitor during any login process) may be provided to any company representative to be a participant in the call 606. If data pertaining to the visitor has been stored previously by the system, the application programming interface 615 may be utilized. This application programming interface may retrieve such visitor data to display in a profile page 608. The visitor data may be retrieved from the data repository unit 114, or from any other storage area linked to the system where such visitor data is stored.

In an embodiment of the present invention, a visitor page may be created for each visitor, either automatically, or upon request of the visitor. The visitor page is similar to the personalized profile pages discussed herein. The visitor page may incorporate information relating to the visitor, and the visitor may select to include information in the page, such as followers and friends, favourite video call sessions, and other information. Other participants in a video call that the visitor engages in may be able to view at least some of the information available on a visitor page. In some embodiments of the present invention participants in a video call who are limited to viewing and hearing the video call may not be able to view the visitors page.

One or more representatives may be participants in the video call with the visitor. One or more socket for sessions 611 may be allocated for a video session. The video call session may be routed through such sockets to engage the participation of one or more specific company representatives 610. The system may incorporate a personalized video profile page 619 or a visitor page. The video call session may further be directed to the personalized video profile page 612 or a visitor page.

Video Call System

FIG. 1 depicts a video call communication system 100 operable to establish a video call between two or more participants. The system can be utilized in a private or a business environment. The present invention can be operable to provide a personalized video call identity.

In embodiments of the present invention, not all the components shown in FIG. 1 may be required to practice the invention, and in some embodiments variations in the arrangement and type of the components may be made in order to practice the invention. The components of the system of embodiments of the present invention may be software components, hardware components, or a combination of software and hardware components. The system of embodiments of the present invention may be operated in a web based environment, mobile based environment, or a combination of a web based and mobile environment.

As shown in FIG. 1, the present invention may be operable from a computer or a mobile device, 101*a*, 101*b*, 101*c*, such as a desktop computer, a laptop computer, a smart phone, a cellular phone, a tablet, or any other computer or mobile device. Moreover, participants in a video call may each engage in the call by way of a computer or a mobile device, and collectively the participants may be engaged in the call via a variety of type of computers and/or mobile devices. Each computer and/or mobile device utilized to engage in a video call must be connected, whether through a wired means or wirelessly, to a network 117, such as an intranet, the Internet, or any other network.

The network 117 is connected or other wise linked whether via a wired means or wirelessly, to a user registration unit 102. The user request unit may be utilized by a user to request a video call. The user may be a website user, a visitor of a website, or a user interested in creating a personalized video account. Each such user may undergo a request process defined in accordance with the nature of such user. For example, a website user may provide a request to the system from the computer or mobile device being used by the user via the network connection, and thereby submit a request for a video call enabling code to be used in a respective website. If the request is generated from a website a video call will be requested through a video call sidebar or other option which is operable for the user to connect with the system and thereby generate a video call from the website, as described herein. A request may also be generated from a website hosted by the system that is directly connected to the system. For example, personalized websites of registered users of the system may be available from such a website.

The visitor of a respective website may request that the system initiate a video call from the respective website. The means whereby such a request is generated and submitted to the system will be dependent upon whether the website is directly connected to the system, or whether the connection to the system is through an element embedded in the website, such as a video call sidebar tool.

The system is also operable for individual users to create a personalized video call accounts associated with a personalized video profile page for establishing video calls. The personalized video profile page will be set-up within the boundaries of a video call provider's environment (e.g., a website, an app, etc.). Such a user will have a personalized video call account with in the video call provider's environment, which will be set-up when the user signs-up with the video call provider. The video call provider will store the information pertaining to the user's personalized video call account and the personalized video profile page. The video call provider may provide tools in the video call provider's environment that can be utilized by the user to create the personalized video profile page.

When a user initiates a private call an invitation will be sent via email, social media messages, or some other messaging means, to the invited participants selected by the user. The message will contain a URL link. Once the invited participant clicks or otherwise activates the URL link the user will be connected to the videocall "room", which may be a webpage, an intranet page, an app, or some other environment from which a video call can be accessed. The invitation may include a personalized message from the user to inform the invited participant of the identify of the user who is initiating the call and any other information that the user wishes to provide to the invited participant. In some embodiments of the present invention the invitation may be automatically generated without input from the user. The URLs included in the invitations may be randomly generated.

A user can set another participant to be linked to the user's account as a friend of the user. The system will store the information pertaining to contacting the friend in the user's account information. One or more friends can be linked to a user's account. A video call with the linked friend can be initiated using the information stored pertaining to contacting that friend. The user can leave a message for the friend if the friend doesn't answer the call.

In the instance that a participant to a video call invites a person who is not signed-up with the video call provider that the user is signed-up with (a "non-member"), the participant must input information for contacting the person into the system. This information will not necessarily be stored in the system, and in some embodiments of the present invention the contact information for the non-member will need to be entered by the participant each time that non-member is to be included in a video call. The information to be entered may include information, for example, such as the person's name, email address and phone number, social media contact information, or other information required to contact that person.

In the circumstance that a the video call is initiated from a third party website, a user may not be required to provide any information in order to be able to either initiate a video call or join a video call session as a participant. For example, a company that has embedded the video call generating code (API) so that a video call can be initiated from the company's website or service environment, may not require a user to provide any information to initiate a video call with one or more company representatives.

As shown in FIG. 1, the system of the present invention may also include a user identity verification unit 104 configured to verify the identity details of the user requesting the video call. The identity details of the user here may be referred as electronic mail (email), mobile number, or other identifying information that is provided by the user when the user signs-up with the video call provider. The user identity verification unit may generate a tag, which is included in the invitation email sent to a participant who is invited to participate in a video call by a user, and the invitation may further contain information about the user and the purpose of the call. The user identity verification unit may be operable to use any of the information that is provided by a user at sign-up and that is stored thereafter to obtain full details regarding the user. For example, the username of the user may be utilized to obtain the email address of the user. The user identity verification unit may be operable to determine whether the user has previously submitted a request for a video call to the system.

In embodiments of the present invention, a user can initiate a video call through any website or app, and a participant can join a video call session through any website or app. Both users and participants may be able to invite more people to join a video call, either before a video call starts, or during a video call. To invite another person to join a video call, an invitation will be sent to the person to join the sender in the sender's video call room. This invitation can be sent through any web browser or mobile application.

Personalized Video Profile Page

Embodiments of the present invention are operable to create personalized profile pages for users and participants of the system who have registered with the system ("members"). In order for a personalized profile page to be created for a member, the member must indicate that a personalized profile page is to be created, or the system must be set-up to automatically create a personalized profile page for all members.

A member who has a personalized profile page can incorporate specific information that will be displayed on the page, such as a friends list. The friends list may be a list of other members of the system and/or non-members with whom the member is likely to want to engage in a video call. The personalized profile page may also provide access to information relating to the greater videocall community of members of the system, and may provide a source of information to follow topics, friends, celebrities, professionals, etc., relating to other members of the system. For example, this information may indicate when other members are engaged in open/public video calls, and the topic being discussed in real time or virtual real time during such video calls. A member who views such information on his or her personalized profile page may join the public video call if the member has an interest in participating in the video call based on the other participants of the call, or the topics being discussed. Posts by participants in video calls may also be viewable on a personalized profile page. Content streamed from a newsfeed, such as is gathered from third party sites, may also be viewable on a personalized profile page. A skilled reader will recognize the variety of possible content available on a personalized profile page. A member may be provided with means of choosing the content to appear on his or her page, as well as a means to organize the content appearing on the page.

As shown in FIG. 1, the system of the present invention may include a video profile page managing unit 106. A user can utilize the video profile managing unit to create a video profile page of the user. The profile page will be generated to incorporate and display details provided by the user about the user, such as, for example, the user's name, the name of the organization to which the user is related (e.g., an employee, partner, owner, or otherwise related to), a communication address (e.g., an email address, a mobile number, a text number, or other communication address). A skilled reader will recognize that other information relating to the user may be provided by the user for the purpose of creating a video profile page.

In some embodiments of the present invention a personalized profile page is automatically generated from each member of the system. It is automatically set up when a member first signs-in to start a call. As an example of a functions operable from the personalized profile page, a member can choose whether to record a call which can be added to the member's library of videos, a member can choose if the member wants the member's library of video calls, or individual video calls to be accessible by everyone linked to the member's profile page, for example, such as friends and followers of the member. A member may also choose to store whiteboards, download documents and save them, record live videos, and other options available from the personalized profile page.

In one embodiment of the present invention the collection of information for the video profile page may include an optional method used to gather customized information relating to the member. This method will gather information from the member, for example, such as username to be utilized by the member, name of the member, and email address belonging to the member. The system will integrate this gathered information into a customized profile page that displays information that will be viewable by participants in a video call, such as the member's name, email address, and the profile can be customized to display other information as well. For example, such information may include any videos, documents, whiteboards, and/or presentations that have been saved by a member and marked by the member as either private or public. Other examples of information that may be displayed include a list of the member's followers and/or a list of the people who the member is following. The list of people who the member is following may be generated at least in part from information gathered from social media sites, such as Facebook™, Twitter™, etc. The information may further include a list of video groups the member is part of, and people with whom the member frequently engages in video calls. A skilled reader will recognize the wide variety of information that may be available on a member's personalized profile page.

In an embodiment of the present invention, only the creator of the personalized profile page (or if the personalized profile page is automatically generated by the system, then the member for whom the personalized profile page is generated) can initiate a video call from the personalized profile page.

In an embodiment of the present invention, portions of the personalized profile page of participants in a video call may appear to the other participants in the call. The information displayed to other participants may be information that makes it is easy for the other participants to identify a participant to the call. For example, the information from the personalized profile page that may be viewable by other participants to a video call may include the participant's name, any affiliation to an organization, whether the participant is the user who initiated the call, any affiliation with any social media group, or other information pertaining to the participant.

Figure 5A:
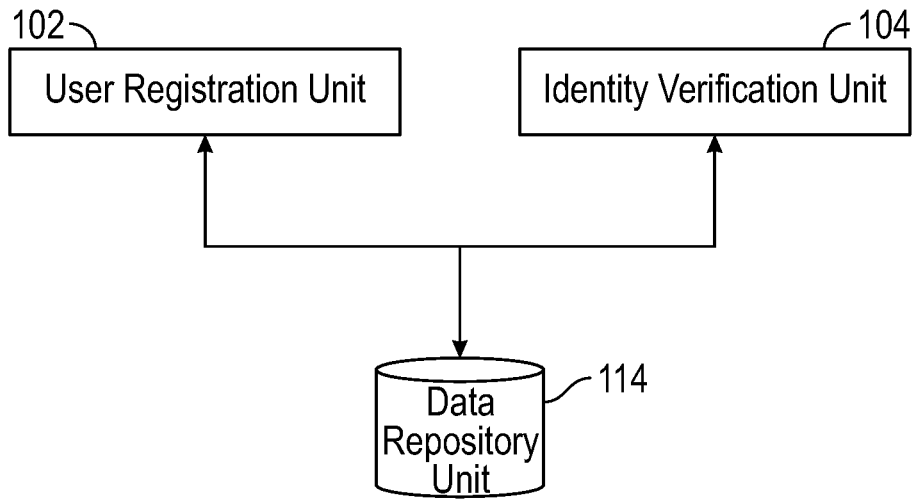
FIG. 5A is a system diagram showing the system elements utilized to register a user with the system, that is an embodiment of the present invention.
Figure 5B:
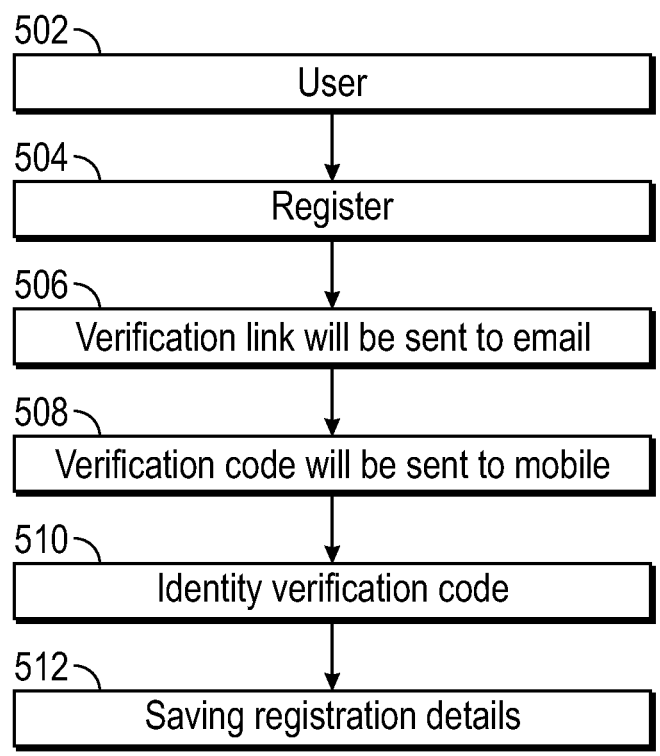
FIG. 5B is a flowchart of steps for generating a verification code, in an embodiment of the present invention.

A method of creating a personalized profile page, when a user logs-in to the system that is available through a video call provider's website or app, is shown in FIG. 5B, and the system elements utilized for such method are shown in FIG. 5A. A user must create a personalized profile page before initiating a video call from such a page.

The user must login to the system 502 and register with the system. The user registration unit 102 receives the registration information. For example, during registration the user may be prompted to input the email address of the user and the mobile device contact number of the user and thereby register with the system 504. On receiving the email address and mobile device contact number, the identity verification unit 104 transmits generates a verification link and a verification code. The verification link is sent by the system to the email address 506 and verification code is sent to the mobile device contact number 508. The user may acknowledge the received verifications and upon receipt of such acknowledgement the system may cause the video profile page managing unit to create a personalized video profile page for the user. An identity verification code may further be generated by the system 510.

In an embodiment of the present invention the user is required to verify his or her email address by clicking on a link provided, or if a user logs-in through Facebook or Twitter clicking on the link to verify the user's email address may not be required.

In an embodiment of the present invention, a personalized profile page may be automatically generated for a user upon login and registration. In other embodiments of the present invention, a user may choose to have a personalized profile page generated by the system during the registration process. Followers of a user may view the user's profile page. As discussed herein, a variety of information may be available on a personalized profile page, including the user's favourite public rooms and the user's scheduled public calls.

The email address and mobile device contact number provided by the user during the request process may be transferred to a storage area 512, and stored in the storage area that is linked to the system, for example, such as in the data repository unit 114.

Recording a Video Call

To initiate a video call, a video call request must be submitted by a user to the system. Upon receipt of the video call request, the system will configure and establish a video call session through the operation of a video call session establishing and creating unit 108, in accordance with the video call request. The video call session may be routed by an application program interface with socket 110 through a video call socket server 112. The video call socket server may be configured to trace a browser session through the application program interface (API) with socket.

As shown in FIG. 1, the system may also incorporate a data repository unit 114, which may be configured to store data. Such data may be stored in an organized collection of data, or in any other order. The data may incorporate information provided by any user, information collected by the system relating to any user (e.g., user activities information and other user data), any recorded video calls, etc. Recorded video calls stored in the data repository unit may include recorded video calls that a participant has requested be sent to the participant, and upon such recorded video call being sent to a user the copy in the repository unit will be deleted. Alternatively, if a recorded video call is required to be saved and stored over a period of time, such recorded video call may be stored in the repository unit over a period of time.

The video call may be captured by a video call recording unit 116, which may be configured to record the video call from when the call is initiated until the call terminates. The video call may be captured in a variety of formats. The video call recording unit is operable to record a video call if any of the following occur: a participant requests that a copy of the video call be captured prior to the initiation of a call; the video call is flagged by the system in accordance with system parameters to be recorded; or the system is pre-set to record all video calls.

In an embodiment of the present invention, the people who are able to record a video call are controlled by the user who initiates the video call. For example, the user who initiates the video call may choose to record the video call. The user who initiates the video call may also permit other participants engaged in the call to record the call. For example, the user may permit all participants engaged in a video call to record the video call, or the user may permit only one or more of the participants engaged in a video call to record the video call.

In an embodiment of the present invention that is pre-set to record all video calls, the video call may be only be stored after the call terminates if the video call is flagged by the system in accordance with system parameters to be recorded. The system parameters may be set to record video calls based on a variety of parameters, such as video calls that are: initiated by a particular user; initiated by a user from a particular organization; via a particular personalized user profile; via a particular website; or that are of a particular nature for which a parameter is set.

If video call is being recorded and a participant indicates prior to the call or during the call that they would like to receive a copy of the video call it is possible that the recording of the video call may be deleted from the repository unit, or any other storage area where the recorded video call is stored by the system, after a copy of the recorded video call is sent to the participant (or participants, if multiple participants request a copy of the video call).

It is also possible for a copy of the recorded video call to be sent to a person who was not a participant of the video call in some instances, for example, such as if a person invited to a video call is unable to participate, or if an organization requires that a copy of all video calls participated in by members of their organization be sent to the organization. A skilled reader will recognize that there are many other reasons why a video call may be recorded and a copy of that recording provided to a person who was not a participant of the video call.

In some embodiments of the present invention a recorded video call that is stored in the data repository unit or other storage of the system may be accessible to some persons. The persons who will be granted access to the recorded video call may be set by the system, or may be set by the user who initiated a particular video call that has been recorded. Additionally, access to recorded video calls may be limited for private video calls, so that the recorded video call can be accessed by one or more of the following: only the user who initiated the video call; all the participants to a video call; or persons authorized by the user or one or more of the participants to the video call.

Public/Private Mode

A skilled reader will recognize that any communication between the visitor, followers, friends, and/or the representative team may be established over the Internet or another communication network. A skilled reader will also recognize that the website may be accessible through the Internet or any other communication network, including through an intranet.

The system may be operable so that visitor or other user initiating a video call can initiate the call in a public mode (or "open mode") or a private mode. If a video call is initiated in a public mode the system may be configured to allow for a wide range of persons to join and participate either fully or in a limited manner in the video call. For example, in the public mode, followers, friends, other affiliates of the visitor, and other groups of persons whose contact information is known to the visitor may join the video call. It is possible in some embodiments of the present invention that persons whose contact information is not known to the visitor who initiates the call, including followers and/or friends of other participants in the call, or persons who view the video call through a website and who are otherwise unrelated to participants in the call may join the video call. A skilled reader will recognize that one or more parameters may be set to indicate the scope of the participants in a call.

In one embodiment of the present invention, the user initiating the video call may set such parameters before the call is initiated. In such an embodiment, there is no default option. The user chooses whether the call is an open or private call.

All participants in a call will require access to a video call participation option, which may be provided via an electronic communication directed to a person, such as an email, text, tweet, or other electronic communication, or as may be available from a website or other page available through a network.

A public mode call may be set to be recorded and may be shared with other persons after the call, either by invite or through making the video generally available to the public. A skilled reader will recognize that access to a recorded video call may be provided directly from a participant having stored a copy of the video call, through the dissemination of copies of the video call to other persons by either the system or call participants having a copy of the video call in their possession, or through a storage area linked to the system and facilitation of open or limited access to such stored video call. A skilled reader will further recognize that access to either a stored video call, or copies of a video call may be limited or full access, and that such access parameters may be set by the system or the call participant(s) depending on the mode of access or dissemination of the video call after the call is terminated.

A visitor to a website who initiates a video call can delete any one or more participants to the video call during the video call, or otherwise limit the participation of any one or more participants to the video call during the video call. In this manner the visitor who initiates a video call can control participation in the video call.

If a person is abusive during a video call session, the initiator, who also acts as a moderator, will have the ability to kick that person off the session be terminating that participant's connection to the video call session. The initiator can also report the abusive participant to the video call provider for review and actions such as warnings, removals or suspensions of that participant's video call account, or blacklisting that participant, will be considered. If the call initiator leaves the call the option to remove a participant from the video call may not be available. However, the other participants can still report an abusive participant.

A private mode video call initiated by a visitor may involve a visitor choosing that the call will be private, in the same manner as non-visitor initiators of calls. In such an instance, participants can only be asked to join the call by social media, email or a URL which can be copied and pasted into a text message. The visitor video call initiator decides on the participation functions for invited participants.

Initiating a Video Call

Figure 3B:
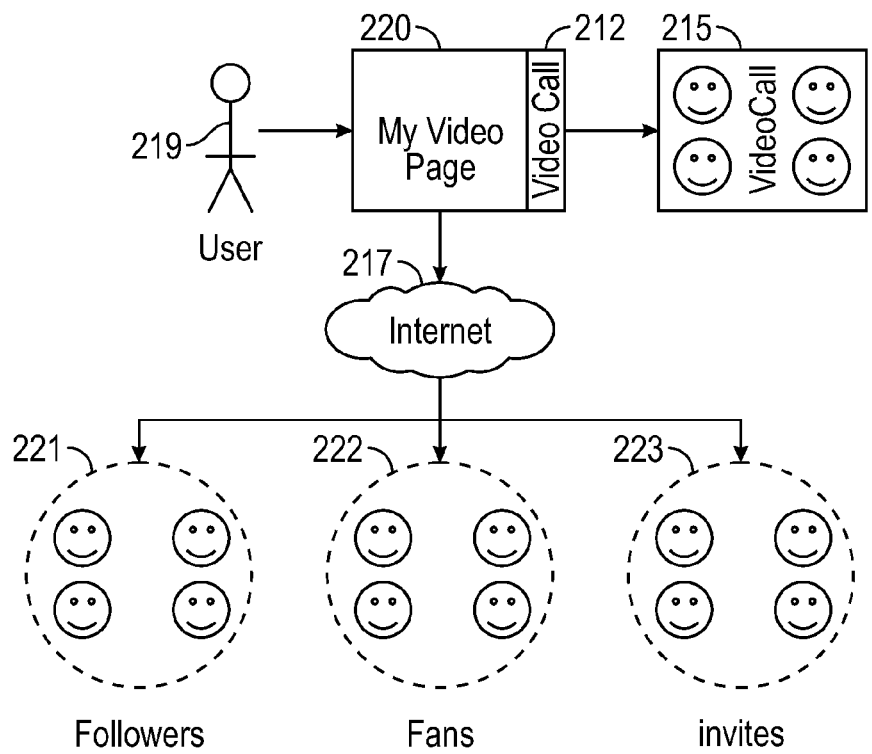
FIG. 3B is a system diagram showing a system operable for a registered user to initiate a video call from a personalized video webpage, that is an embodiment of the present invention.

Another embodiment of the present invention is operable a video call to be initiated by a user any of a third party website, a personalized profile page of the user, or a page in the video call provider's website. As shown in FIG. 3B, a third party website may include an option whereby the video call system is operable to initiate a video call from the a page of the third party website. In such an embodiment of the present invention, a user 219 may initiate a video call from the third party webpage 220 that has a video call initiating option 212 embedded in the third party webpage. The video call initiating option can be selected from the third party webpage by the user to initiate the video call 215 between the user and one or more other persons. Prior to the video call and/or during the video call the user can invite other persons to join and participate in the video call by sending invitations to such persons via the Internet 217, or another network connection between the user of the third party webpage and such other persons. For example, the user may invite one or more of the user's follower's 221, one or more of the user's fans 222, or other invitees 223, or one or more other people whose contact information is known to the user, to join the video call.

In an embodiment of the present invention, a third party website may incorporate a personalized webpage. A personalized webpage can have the script for the video call added as a sidebar or other option, just as described herein for other third party websites. The videocall API can be initiated from a link or button on the sidebar.

The system may be operable so that the user initiating a video call can initiate the call in a public mode or a private mode. If a video call is initiated in a public mode the system may be configured to allow for a wide range of persons to join and participate either fully or in a limited manner in the video call. For example, in the public mode, followers, fans, other invitees, friends, other affiliates of the user, and other groups of persons whose contact information is known to the user may join the video call. It is possible in some embodiments of the present invention that persons whose contact information is not known to the user who initiates the call, including followers and/or friends of other participants in the call, or persons who view the video call through a website and who are otherwise unrelated to participants in the call may join the video call. A skilled reader will recognize that one or more parameters may be set to indicate the scope of the participants in a call.

Parameters for a video call may be are set during a video call initiation process that occurs after the request to initiate a video call generated by a user. A user will have an option to alter the session from private to public mode, or vice versa, during the call.

All participants in a call will require access to a video call participation option, which may be provided via an electronic communication directed to a person, such as an email, text, tweet, or other electronic communication, or as may be available from a website or other page available through a network.

A public mode call may be set to be recorded and may be shared with other persons after the call, either by invite or through making the video generally available to the public. A skilled reader will recognize that access to a recorded video call may be provided directly from a participant having stored a copy of the video call, through the dissemination of copies of the video call to other persons by either the system or call participants having a copy of the video call in their possession, or through a storage area linked to the system and facilitation of open or limited access to such stored video call. A skilled reader will further recognize that access to either a stored video call, or copies of a video call may be limited or full access, and that such access parameters may be set by the system or the call participant(s) depending on the mode of access or dissemination of the video call after the call is terminated.

A user who initiates a video call, whether from a third party website, a webpage of a video call provider, or a personalized user profile webpage, can delete (e.g., kick out, or terminate) any one or more participants to the video call during the video call, or otherwise limit the participation of any one or more participants to the video call during the video call. In this manner the user who initiates a video call can control participation in the video call.

In an embodiment of the present invention, a parameter can be set to limit the number of participants during the video room creation, which occurs when a user initiates a video call. During the call the call initiator can amend the number of participants. A call initiator can also remove participants from the call.

A video call session occurs within a "video room" of the system, and therefore the creation of a video room refers to the preparation of the environment of the video call, which includes aspects such as the number of participants, any limitations of the participation of any participants, whether the call is public or private, etc. A private mode video call initiated by a user can be said to occur in a private room, wherein all participants must be invited.

Embodiments of the present invention may apply variant modes of initiating a video call. The steps may vary so as to be consistent with the type of call to be initiated. For example, the call may be initiated by a visitor to a website, a user from a user's website, or a user from a personalized user profile or personalized webpage. Generally, when a video call is initiated the first step will be to perform a query to ensure that a video call is not already in progress from the webpage or profile page from whence the call is to be initiated. If the response to the query indicates that no video call is in progress from the webpage or profile page, then the system will set up a channel connection for a video call and engage the media required for the video call, for example, such as a webcam and microphone stream from the computer or mobile device of the visitor or user who is requesting that a video call be initiated. Once these steps complete successfully the video call session will have initiated and the next step is to make a connection with the computers or mobile devices of each of the one or more persons who are to be initial participants in the video call.

When an invitee or other person wishing to join and participate in a video call utilizes the link, button or other option that is provided for such person to utilize to join a video call, the system undertakes certain steps to cause the person to be joined into the video call. For example, one such step is gathering information to identify the video call that the person is to join. An embodiment of the present invention may be operable to obtain information pertaining to a user's video call session and the session identification in particular. The session identification relates to a video call room (e.g., video call session). The video call identification can be saved in list of "favourite rooms" (e.g., favourite video sessions) on a personalized profile page. (The list of favourite video sessions may be a list of the video sessions that are chosen as favourites of the participant. A session can be chosen from the list of favourites to initiate a call with the same participants as were involved in the video call session indicated as a favourite. In this manner, a participant who regularly engages in video calls with the same group of people can automatically initiate a video call with these people without having to go through the invitation process or any search for the public group. If the video session with these people is identified by a session identification, the user of the system can initiate a video call with the same people by choosing the session identification.

It is preferable that the session identification and other session information should only be sought by the system after the system connects to the signaling server. The signaling server functions as the bridge and it identifies the online details of users of the system. The signaling server utilizes the Session Description Protocol (SDP) to exchange user information between users, so that a media streaming connection can be established between the users.

Once the session identification is obtained, the session identification and other session information can be stored in a system storage area, such as the data repository unit or another storage area attached to the system, and the session identification and/or the other session information can be accessed from the storage area and utilized for future steps and/or purposes of the system.

Another step that may be undertaken by the system to cause a person to join a video call that is in progress is that the system may need to make room on the video call of the additional joining participant (joinee). For example, if there is room on the video call for another joinee the system may join the joinee to the video call. However, if there is no room in the video call, the system may generate and run code to create room in the video call session having the identified session identification. The definition of "room" here is the amount of participants the room initiator set to include, in other words the capacity of the room. If the initiator defines the maximum number of participants who can engage in a video call in a video room, then the room is restricted to that number of participants. Once the maximum number of participants is reached no one else can join the call. The initiator can increase the room capacity for participants to a video room during the video call session to accommodate more participants.

Figure 4A:
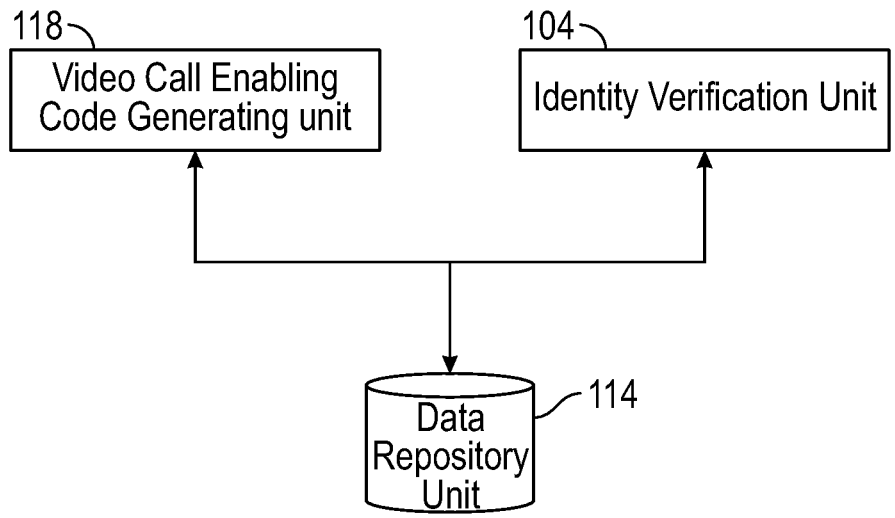
FIG. 4A is a system diagram showing the system elements utilized to generate a code to enable a video call, that is an embodiment of the present invention.

There are a variety of methods and steps whereby a user can request a video call be initiated. In some methods a video call enabling option will already exist on a website or profile page from whence a user or visitor submits a request to initiate a video call. In the instance that a video call enabling option does not exist on a website from whence a user or visitor is to initiate a video call, a user or visitor may take steps to make a video call enabling option available for said website. One such method whereby a visitor or user can request the creation of a video call enabling option to be provided via a website is shown in FIG. 4A.

The video call enabling option embedding method involves a user submitting a request to the system. This request is submitted using a system similar to that shown for a request for initiating a video call shown in FIG. 1. The request submitted by the user will be received by the system and such request will indicate that a video call enabling option is not available from a particular website.

An instruction to generate a video call enabling option will be provided to the video call enabling code generating unit 118. The unit will then undertake steps, as described herein, to generate a video call enabling option and embed in, or otherwise make available from, the identified website.

Figure 4B:
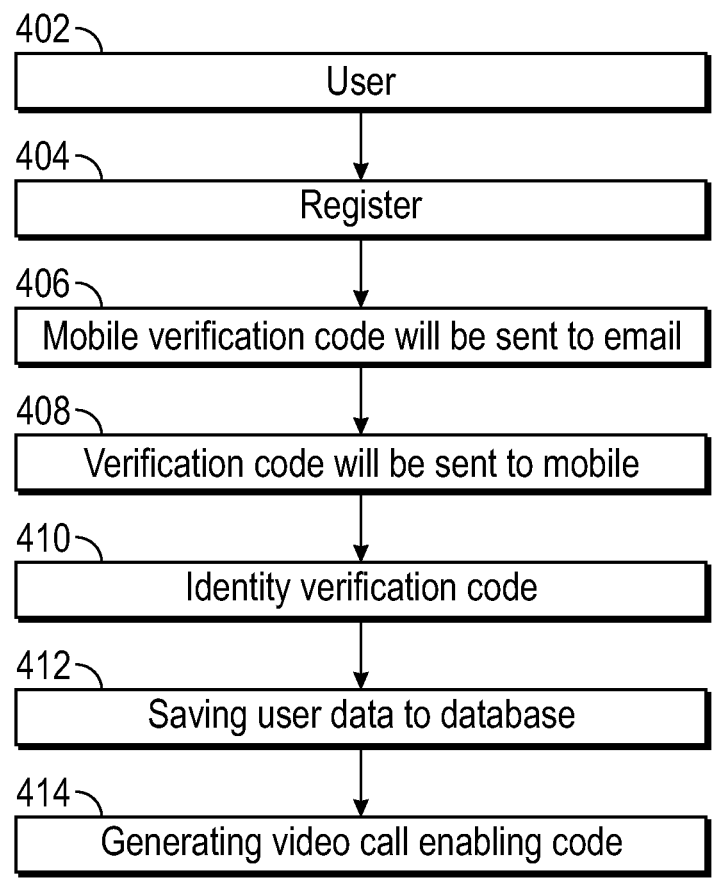
FIG. 4B is a flowchart of steps for registration of a user with the system, in an embodiment of the present invention.

As shown in FIG. 4B, user generates a video call request 402. During the request process the user may be prompted to provide an email address of the user and a mobile device contact number of the user. The system registers the video call request 404. As part of the registration process, upon receipt of the email address and mobile device number the system may cause the identity verification unit 104 to generate a verification link and a verification code.

The system may transmit the verification link to the provided email address 406, and the verification code to the mobile device contact number 408. The user is required to acknowledge receipt of the verification link via email, and the verification code via the user's mobile device to complete the request process 410. The user may activate the verification link and during the activation may input the verification code.

The email address and mobile device contact number provided by the user during the request process may be stored in a storage area linked to the system 412, for example, such as in the data repository unit 114.

The final step in the request process is that the system causes the video call enabling code generating unit 112 to generate a video call enabling code 414 for the website where the video code enabling option will be embedded or otherwise made available. The user may copy the generated code and paste the code in the respective website to embed the video call enabling option on the website for use by website visitors and users.

Inviting Participants to a Video Call

Figure 7A:
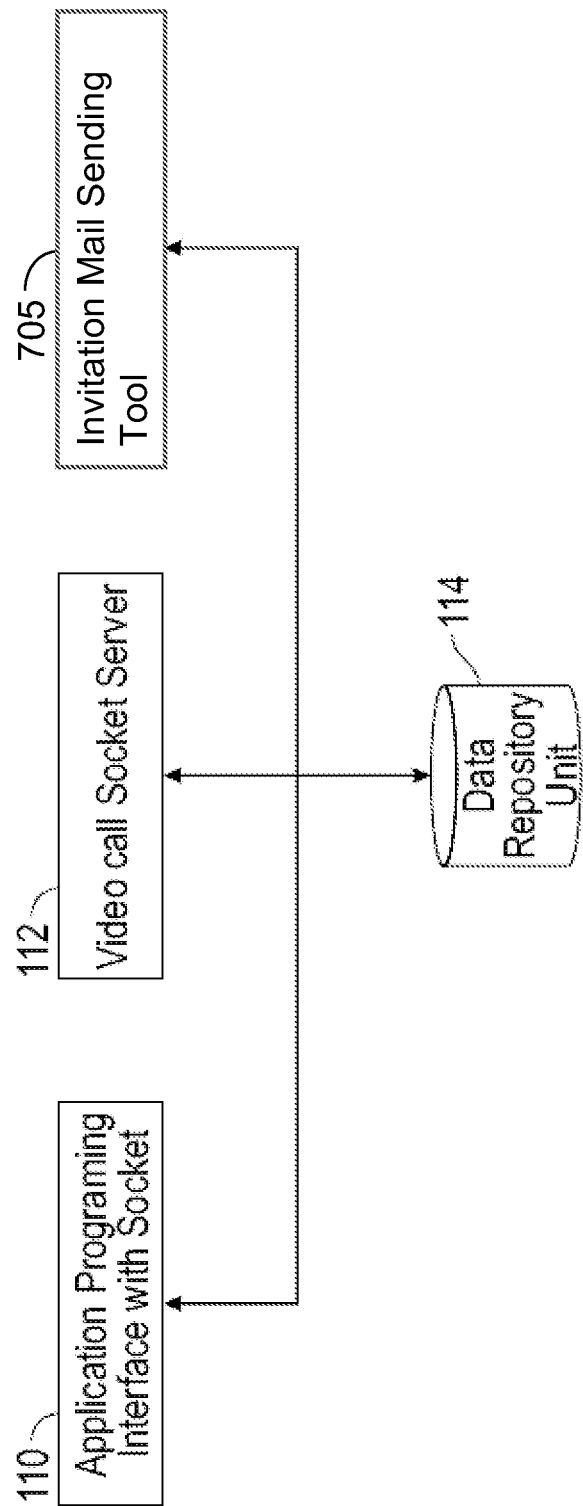
FIG. 7A is a system diagram showing the system elements utilized for inviting an invitee to participate in a video call, that is an embodiment of the present invention.
Figure 7B:
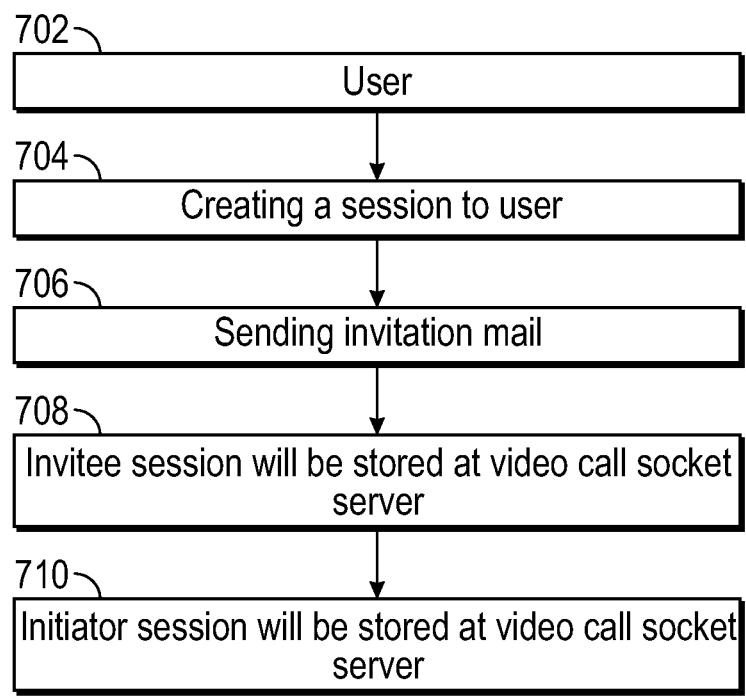
FIG. 7B is a flowchart of the steps to invite an invitee to participate in a video call, in an embodiment of the present invention.

Either prior to the start of a video call, or during a video call, a user can invite one or more persons to participate in the video call. FIG. 7A shows a system, that is an embodiment of the present invention, that is operable to provide such invitations to potential participants. FIG. 7B shows the method for such invitations. FIG. 7A is just one example of a system to provide a method for inviting participants to the video call. The participant invitation method shown in FIG. 7B involves a user creating a request for a video call session 702. The request may be created through use of the application programming interface with socket 110. The application program interface with socket may utilize the video call socket server 112. So that, upon receiving the request the video call socket server may generate a video call session invitation 704 and will transmit the video call session invitation to the invitee 706. The session invitation is sent by operation of the invitation mail sending tool 705 of the system.

In one embodiment of the present invention, the system generates a URL for the video call session. This URL is sent or otherwise transmitted to the invited participant. When the invited participant clicks or otherwise selects the URL the invited participant will be directed to the video room/video call session and this direction will cause the invited participant to join the video room/video call session.

An invitee session may be stored at the video call socket server 708, and the initiator session may be stored at the video call socket server 710. A video call recording can be created of the video call session, through the function of a video call socket server 112 that is operable to store the video call session. The recording that may include video call session room details can be stored in a data storage area linked to the system, such as the data repository unity 114.

The video call process of an embodiment of the present invention is shown in FIG. 8. A skilled reader will recognize that other processes for video calls in accordance with the present invention are possible as described herein. The example of a video call process in FIG. 8 involves a video call between two users. A skilled reader will recognize that video call can be created between more than two users, and that a video call can be between a user who initiates the call and one or more other persons, as discussed herein.

Figure 8A:
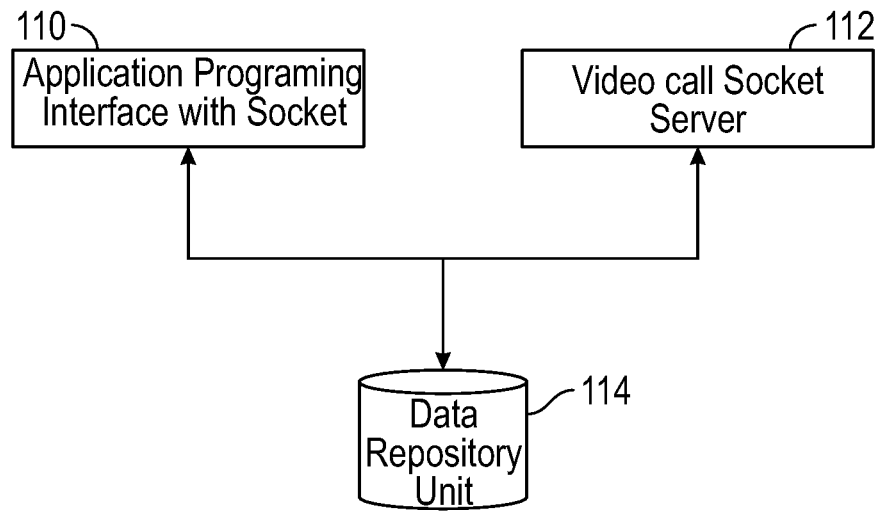
FIG. 8A is a system diagram showing the system elements utilized by a method for generating a video call process, that is an embodiment of the present invention.
Figure 8B:
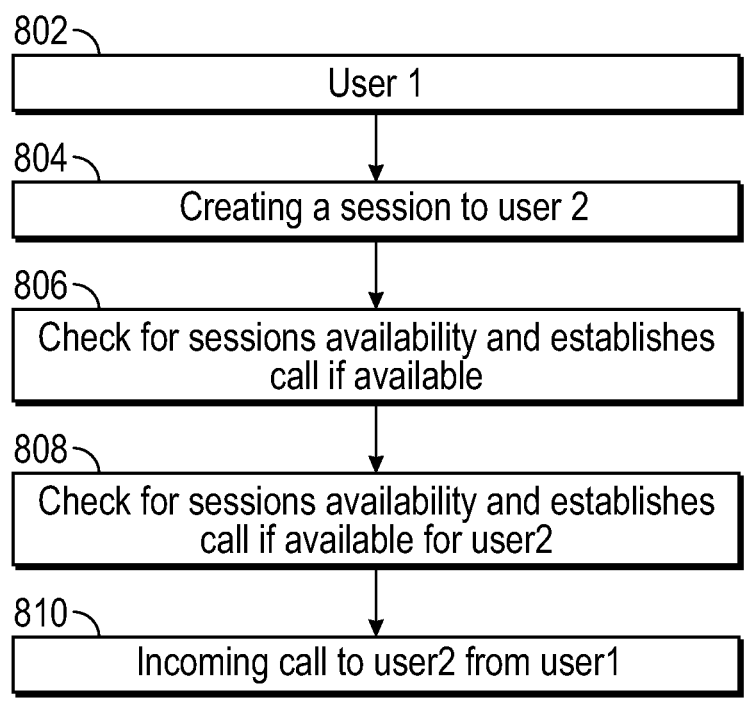
FIG. 8B is a flowchart of the steps for creating a session for a second user, in an embodiment of the present invention.

An example of a method for making a video call is shown in FIG. 8B and the system elements utilized for this are shown in FIG. 8A. A skilled reader will recognize that a variety of methods and systems may be utilized to make a video call, as discussed herein, and that FIGS. 8A & 8B are provided as an example of one such method and system.

As shown in FIG. 8B, a video call method may involve a user (e.g., User1) requesting a video call with another person (e.g., User2) 802. The request for a video call will be processed by the application programming interface with socket 110, as described herein. The video call session may be created by the application program interface (API) with socket 804. This may involve configuring the video call socket server 112 to check the session routing. The session routing from User1 will be checked for the availability of video call sessions 806. If the check returns a result that there is availability for video call sessions from User1, the video call socket server will establish the video call in response to the request of User1. Establishing the call may involve the video call socket server further being configured to check the session routing to User2 808 for availability of video call sessions. If the check returns a result that there is availability for a video call session to User2 the video call socket server allows User1 to make an incoming call to User2 810. Data generated by the video call session between User1 and User 2 may be stored in the data repository unit 114 or any other storage area linked to the system.

The following method may be used by the system to establish a video call between a first user requesting the call (User1) and one or more other persons. The system may review the local stream of User1 and check whether User1 is the initiator of the video call. A route or room or other space for the video call session may be established by the system, and media required by the system will be reserved for the call. The media required for a call that is engaged for a call may include a variety of media, for example, such as a microphone, a webcam, a touchscreen, a mouse, a keyboard, a music player, a video player, or any other media.

The initiator of the video call is referenced as User1 in this description for the purpose of clarifying specific activities required by and available to the initiator of the call. However, once the call is initiated User1 is also considered a participant of the call, and has the capabilities and experience described herein as that of any participant(s) to the call.

The system next attempts to establish the video call session between User1 and the one or more other persons identified by User1 to be engaged in the call. Should any of the one or more other persons identified by User1 to be engaged in the call not be available to participate in the call, or should the system otherwise be unable to establish a link between User1 and such other person, the system will provide a notification to the person who is not reached that User1 had tried to connect in a video call session with such person, and provide an alert to User1 that such person is unavailable for a call. **Notifications include: new followers, missed calls, IM from friends and video voicemails.

This step of gathering information relating to a participant may occur each time a new participant joins the call, so that the system gathers information about each participant upon such participate joining the call. At least some of the information regarding the participants in a call will be made available to the participants of the call and to other persons not participating in the call, so that participants and some non-participants can be aware of the participants of the call. The participant information is updated each time a participant joins the call, or logs off the call. **All participants are known by their username which will be displayed under the participant list in the room. The difference between private and public is private rooms are not published or promoted in the public domain and participants to a private room are only those invited by the initiator.

While engaged in a video call, participants may be able to send private messages to one or more of the participants. The message may be displayed on the screens of the participants, and/or may be sent to other devices of the participants, such as text message sent to a mobile device of all or some of the participants.

In one embodiment of the present invention, participants can send SMS (short message service messages) rather than an IM (instant message) to another user. The mobile or cell numbers of all of the registered members will be stored in the user database. If a member is using the mobile app version of the present invention through a mobile connection via a mobile device and wants to send a SMS to another member, the system will direct the SMS to be sent from the member's mobile phone SMS service. If user is using a mobile app with no mobile connection (e.g., tablets with no SIM card support), then the SMS will be routed and sent via our SMS gateway service. SMS will be routed in a similar manner for members utilizing the system through websites via a mobile device.

While engaged in a video call, participants may be able to send messages to all participants. The message may be displayed on the screens of the participants to whom the message is sent, or may be sent to other devices of such participants, such as text message sent to a mobile device of such participants.

User1 may control the participation of other participants in the call. For example, User1 may control which participants have enabled microphones and can thereby have an audio feed that can be heard by other participants. This control can occur when a participant joins the call and/or during the call. So that a participant may join the call and have an enabled microphone upon joining the call, but User1 may choose to disable a participant's microphone during the call. As another example, User1 may control the video input of a participant by enabling and disabling the webcam, or other camera used by a participant to provide visual input into the video call.

In some embodiments of the present invention, a tool may be engaged by the system that is operable to recognize words, phrases, key words or other content of the discussion of the participants during the video call session. The system may utilize the recognized content to provide information about the real time discussions of the participants in the video call session to provide information about the flow of the video call session to participants and/or non-participants. For example, the tool may be a speech recognition software tool. It may also be possible for the tool to be operable to recognize written text and drawings that may be entered on a white board or a screen and thereby disseminated to the participants.

In an embodiment of the present invention, keywords relating to video call content may be generated from three primary sources: (1) the description of the video room; (2) the messages between the participants during the video call; (3) the audio conversation between the participants in the room, for which a translator to translate spoken words to written words may be utilized.

The recognition tool may allow a participant who is required to engage in the video call session for only certain topics to monitor the flow of the topics discussed by the participants, without having to listen and participate in the entire video call session. For example, in a video call session that is a business meeting between members of a company, a participant may monitor the disseminated information about the content of the discussion of the participants, either after joining the video call session, or before joining into the video call session. While the disseminated information indicates that the discussion is not relevant to the particular company member that company member does not need to engage in the video call session. For example, the business member may not be joined into the video call session, or may have the video call session discussion on mute if such business member has joined the call session as a participant. However, once the disseminated information about the discussion of the participants shows that the content of the discussion is relevant to the business member such business member may then become fully engaged as a participant of the video call session.

A whiteboard tool may be available to one or more participants in a video call session. For example, the availability of the whiteboard tool to various participants in a video call session may be set by the party who initiated the video call session (e.g., User1). It may be possible for the availability of the whiteboard to be altered during a video session, so that one or more participants may have access to the whiteboard tool during portions of the video call. For example, if the video call is a meeting of participants who are working on a joint project, the whiteboard may be available to one or more particular participants at specific times during the call, when such particular participants are presenting regarding their portion of the joint project, and the whiteboard tool may be available to one or more other participants during other points during the call.

The whiteboard tool permits one or more participants to have the opportunity to write or draw upon a whiteboard, and for that writing or drawing to be presented to one or more other participants during the video call session. The whiteboard tool will function in a manner similar to a physical whiteboard used in a meeting when the participants are physically present in the same room. A skilled reader will further recognize that the whiteboard tool may be utilized in any manner that is particularly relevant to the video call session and the sharing information between two or more participants of the call. Information written or drawn upon the whiteboard of the whiteboard tool during a video call session may be stored after a call and may be accessible by the user who initiated the call, and possibly to other participants as well. The access to the participants may be in accordance with settings and parameters inputted to the system by the user who initiates the video call. It may also be possible for access to the whiteboard drawings and written information to be altered after the video call by the use who initiated by the video call. For example, if the written or drawn whiteboard information from a video call becomes relevant to certain participants of the system the user who initiated the video call session during which the whiteboard information was captured may grant access to the whiteboard information to such participants. Or should the whiteboard information become irrelevant to certain participants after the video call session, the user who initiated the video call session may terminate the access of such participants to the whiteboard information after the video call session.

At any point during the video call a participant may leave the video call by logging off the video call. Any participant can take the required steps to end its participation in the video call session. For example, in some embodiments of the present invention an "End Call" button may be displayed to a participant upon the screen that the participant is utilizing to participate in the video session, and upon the participant selecting the "End Call" button, the participant's participation in the video call session will be terminated. The user who initiates the video call session may logoff the video call session and the other participants may continue to participate in the video call session. If a participant marks the call as one of its favourites, so that the system recognizes the video call as a favourite of the participant, then that participant may be able to find the video call session listed in that participant's list of favourite sessions and may be able to return to the video call at a later time if the call is continuing at that time by selecting the call from the favourites list. The video call session must be identified as a favourite session before the participants leaves the video call session in order for the session to be stored in the list of the participant's favourite calls. Should the call have ended, a participant selecting the session from the participant's favourites lists may initiate a new video call session to which all the same participants are invited who were participating in the video call session at the point in time when the participant originally saved the video call session as a favourite.

The call can be ended by all of the participants having logged off the video call session. There can be a variety of means whereby a participant may logoff a video call session. One example is utilizing a End Call button as described above. In some embodiments of the present invention, it may be possible for the use who initiated the video call session, or another participant who is granted administrator status, to end the call for all participants simultaneously.

Once a call is ended it is possible that a copy of the video call session may be stored in a storage area linked to the system. A copy of the video call session may also be sent to a participant after the call has terminated. The copy of the video call session may be sent by any means, including email, text, selected download, etc. In an embodiment of the present invention the copy of the video call session will be sent directly to external storage as indicated by the participant who requests the copy, and a copy of the video call session will not be stored in the system.

Once a participant receives a copy of the video call session, the participant may store a copy of the video call session on their personal device, or in any other location where the participant chooses to store the copy of the video call session.

In one embodiment of the present invention, a copy of the video call session may also be saved on the system. For example, the copy of the video call session may be accessible by the participant from the participant's profile page within the system. The copy of the saved video call session may be viewed privately by the participant on the system, or may be shared with other participants so that multiple participants can view the saved video call session.

Notably, embodiments of the invention that do not consistently save a copy of the video call session may not be at risk for dissemination of any private information relating to video call sessions. For example, such systems may not be at risk of a third party hacking into the system storage area or by other means whereby private video call session data is disseminated because the video call session information will not be stored on such an embodiment of the system.

Figure 9:
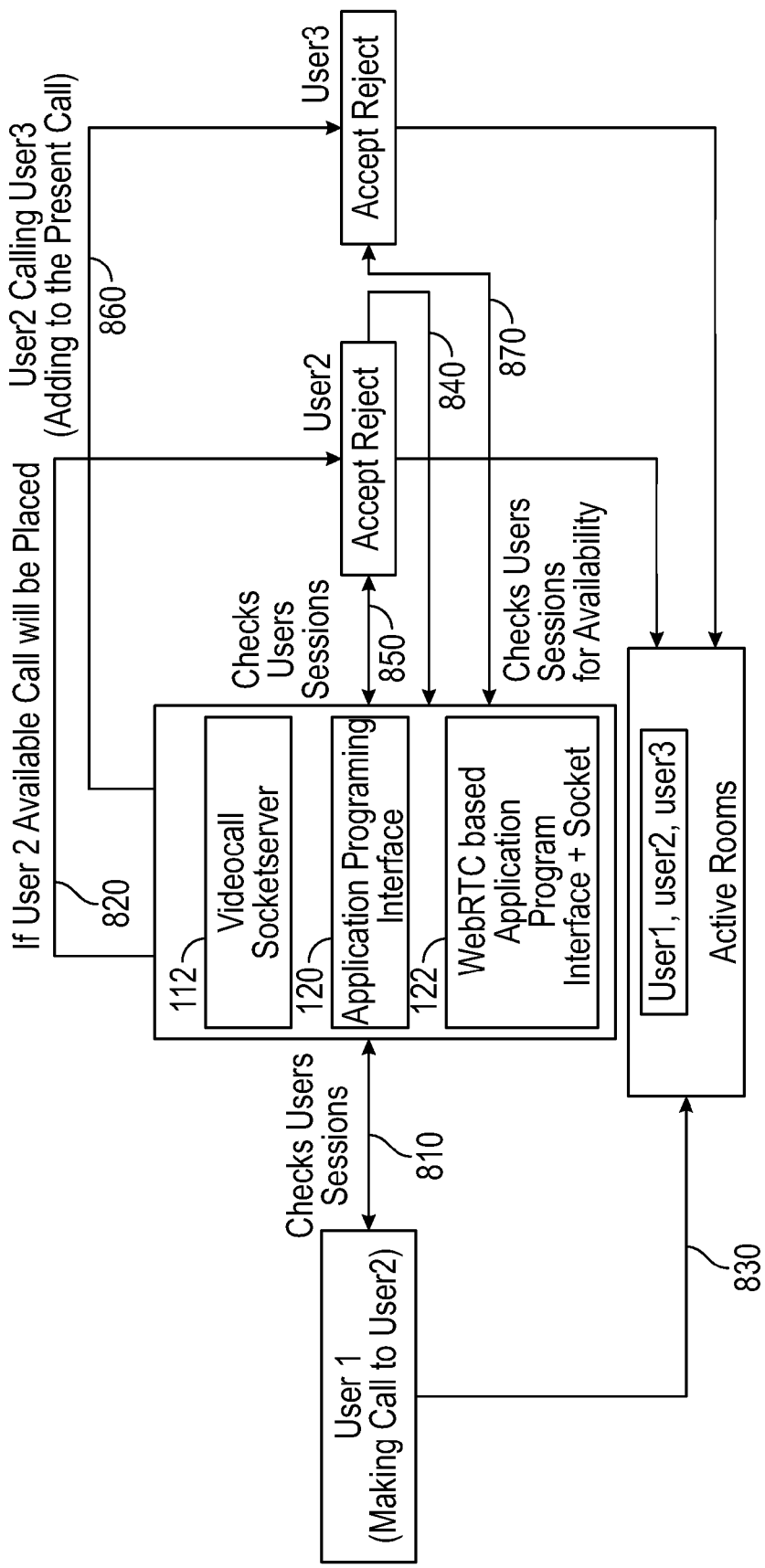
FIG. 9 is a system diagram showing the structure of system elements utilized to establish a video call session between multiple users, that is an embodiment of the present invention.

An embodiment of the present invention that is a system for a call between more than two participants is shown in FIG. 9.

For example, the multiple participant video call system of FIG. 9 shows an embodiment of the present invention that creates a call between User1 who initiates the call and two other participants, User2 and User3. A skilled reader will recognize that this is merely an example of an embodiment of the system, and other embodiments of the present invention may incorporate a system operable to engage more than three participants in a video call session.

FIG. 9 further provides an example of an initial video call between participants, and the addition of other participants to the initial video call. Specifically, in FIG. 9 User1 initiates a video call with User2, and User3 joins the video call as a participant at the invitation of User2. A skilled reader will recognize that in other embodiments of the present invention multiple parties may initially be joined in the call, and multiple participants may join the video call by invitation of a participant to the call, or by other means.

As shown in FIG. 9, in one embodiment of the present invention User1 may submit a request to initiate a video call with User2 to the system. The request is transferred to the system and the system will check session availability for the video call 810. The system may cause the video call socket server 112, the application program interface 120 and the webRTC based application program interface and socket 122 to operate to check the availability of a video session initiated by User1. If the results of the check indicate the requisite available, a video call session between User1 and User2 may be initiated.

The system will then perform a check for session availability for User2 to engage in the video session. If the results of this check indicate that there is session availability for User2 to engage in the video call, then the video call request is sent to User2 from User1. The request for User2 to join the video call session 820 sent by the system to User2 may be accepted or rejected 840 by User 2. The acceptance or rejection of the request from User1 to User2 to join the video session is provided by User2 to the application programming interface. If an acceptance is received from User2 by the application programming interface the video call session between User1 and User2 is set-up.

User2 may send an invitation for User3 to join the video call 850 and this invitation may be indicated to the system. The system will then perform a check for session availability for User3 to engage in the video session. If the results of this check indicate that there is session availability for User3 to engage in the video call, then the video call request is sent to User3 from User2. The request for User3 to join the video call session 860 sent by the system to User3 may be accepted or rejected 870 by User 3. The acceptance or rejection of the request from User2 to User3 to join the video session is provided by User3 to the application programming interface. If an acceptance is received from User3 by the application programming interface User3 joins the video call session already in session between User1 and User2.

The video call session may occur in one or more active rooms 830 that each participant to the video call is connected. Initially User1 and User2 are connected to the active rooms. User3 is connected to the active rooms when User3 joins the video call. The participants leave and disconnect from the active rooms when a participant leaves the video call, or when a participant is ejected from the video call by another participant. The user who initiates a video call session may eject a participant from a video call session by terminating that participant's participation in the video call session. For example, a participant may be ejected if such participant is engaging in disruptive behaviour. As an example of one possible means whereby a user who initiates a video call session can eject another participant, the user who initiates a video call session may be able to select one of the participants to the video call session from a list of participants, and a button may be available to the user who initiated the video call session whereby if the button is selected, the participation of the participant in the video call session is terminated. A skilled reader will recognize that other means for ejecting a participant from a video call session may be available.

A skilled reader will recognize that other participants can be joined to the video call in a similar manner.

Figure 10:
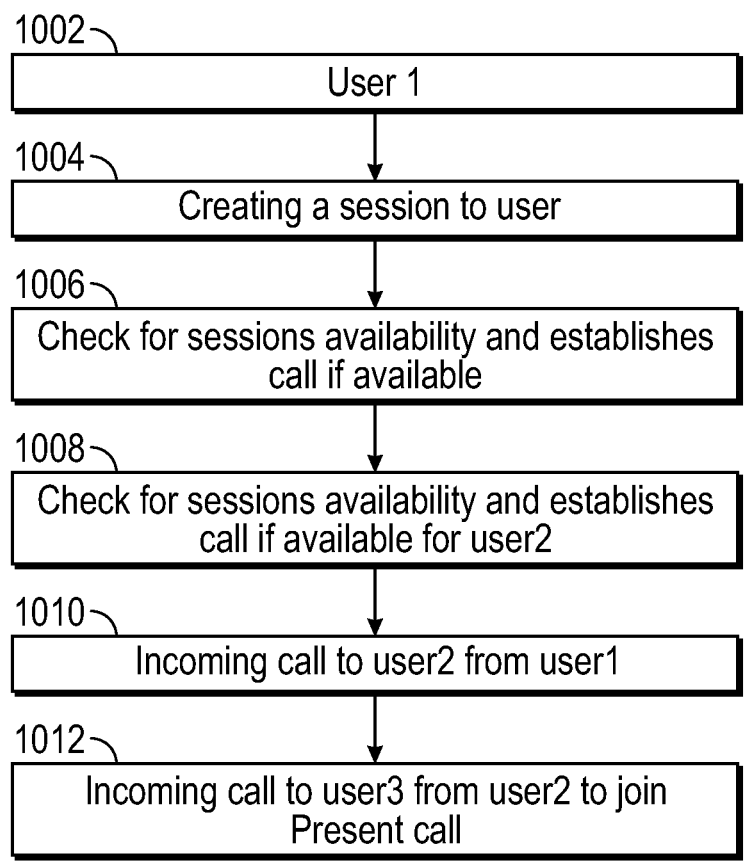
FIG. 10 is a flowchart of the steps for adding multiple users during a video call, in an embodiment of the present invention.

FIG. 10 shows an embodiment of the present invention for a participant adding method that the system is operable to perform during a video call. User1 initiates a video call session 1002. The video call session may be initiated through operation of the application programming interface with socket and the video call socket server. The system creates a session to user 1004 upon receipt of the request from User1. The video call socket server checks for an available video call session route 1006. If an available video call session route is available, the system further checks for session availability whereby User1 can engage in a video call with User2 1008. If an available video call session route exists, a request to join the call is sent to User2. User2 accept or reject such request to join the video call.

Should User2 accept the request to join the video call, an incoming call 1010 is generated from User2 to User 1. User2 may utilize the system to make an incoming call to provide a request to User3 to join the current video call session 1012. The application program interface (API) with socket 120 may check the availability of video call sessions with User3. If there is availability User3 may join the video call in session between User1 and User2. A copy of the video call session may be stored in the data repository unit 114, or any other storage area linked to the system.

Figure 11:
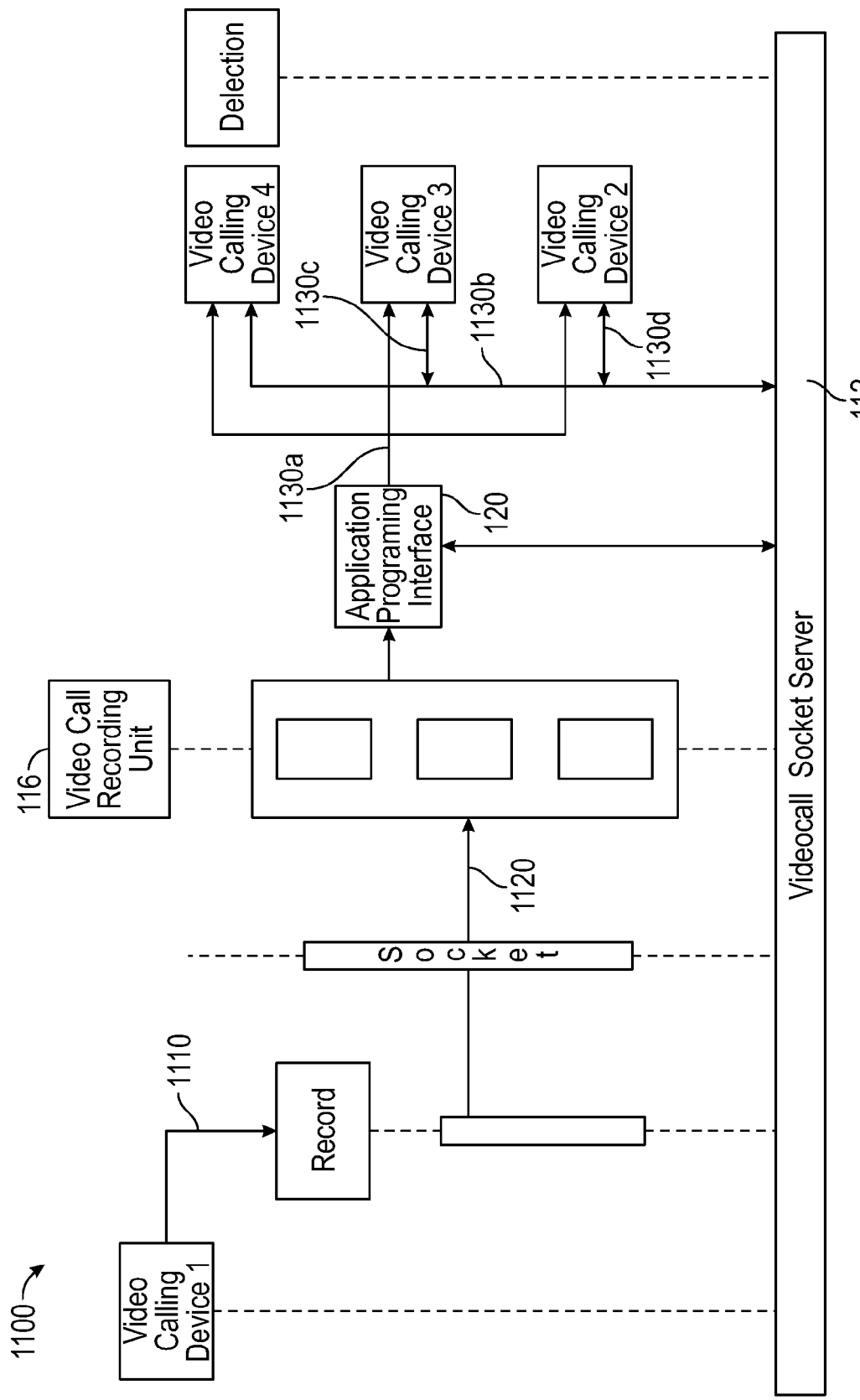
FIG. 11 is a system diagram showing the system elements utilized in a process for capturing videos and uploading such videos in the recording unit, that is an embodiment of the present invention.

FIG. 11 shows an embodiment of the present invention that incorporates a system operable to capture call video sessions and to upload such sessions in the recording unit. The video calling device that a participant of the video call utilizes to participate in the video call may record or otherwise capture the video call session and related data as a record 1010. The record may be transferred to a video call recording unit via a socket 1020. The record may be stored in the video call recording unit 116. The application program interface (API) 120 may be operable to generate one or more copies of the record and to transfer a copy of the record to video calling devices of participants of the video call, or video calling devices of other persons. For example, copies of the record 1030a, 1030b, 1030c and 1030d may each be sent to one of video calling device2, video calling device3, and video calling device4.

Further the recorded videos may be deleted after a few seconds and the recent recorded videos of the video call may be updated. This process may be processed by a video call socket server 112. The update of the recent recorded videos after a video is deleted will involve removing the deleted video from the list of recent recorded videos.

Embodiments of the present invention may have different appearances when viewed by participants to a video call while the video call is in progress. A skilled reader will recognize the wide variety of possible appearances of the video call that may appear on a participant's screen during the video call. FIGS. 12A, 12B, 12C, 12D, 13A, 13B, 13C, and 13D, provide examples of some possible appearances of some screens of embodiments of the present invention that may be viewable by participants to the video call.

FIGS. 12A, 12B, 12C, 12D show examples of appearances of screens viewable by participants of a video call if the video call is initiated from a webpage.

Figure 12A:
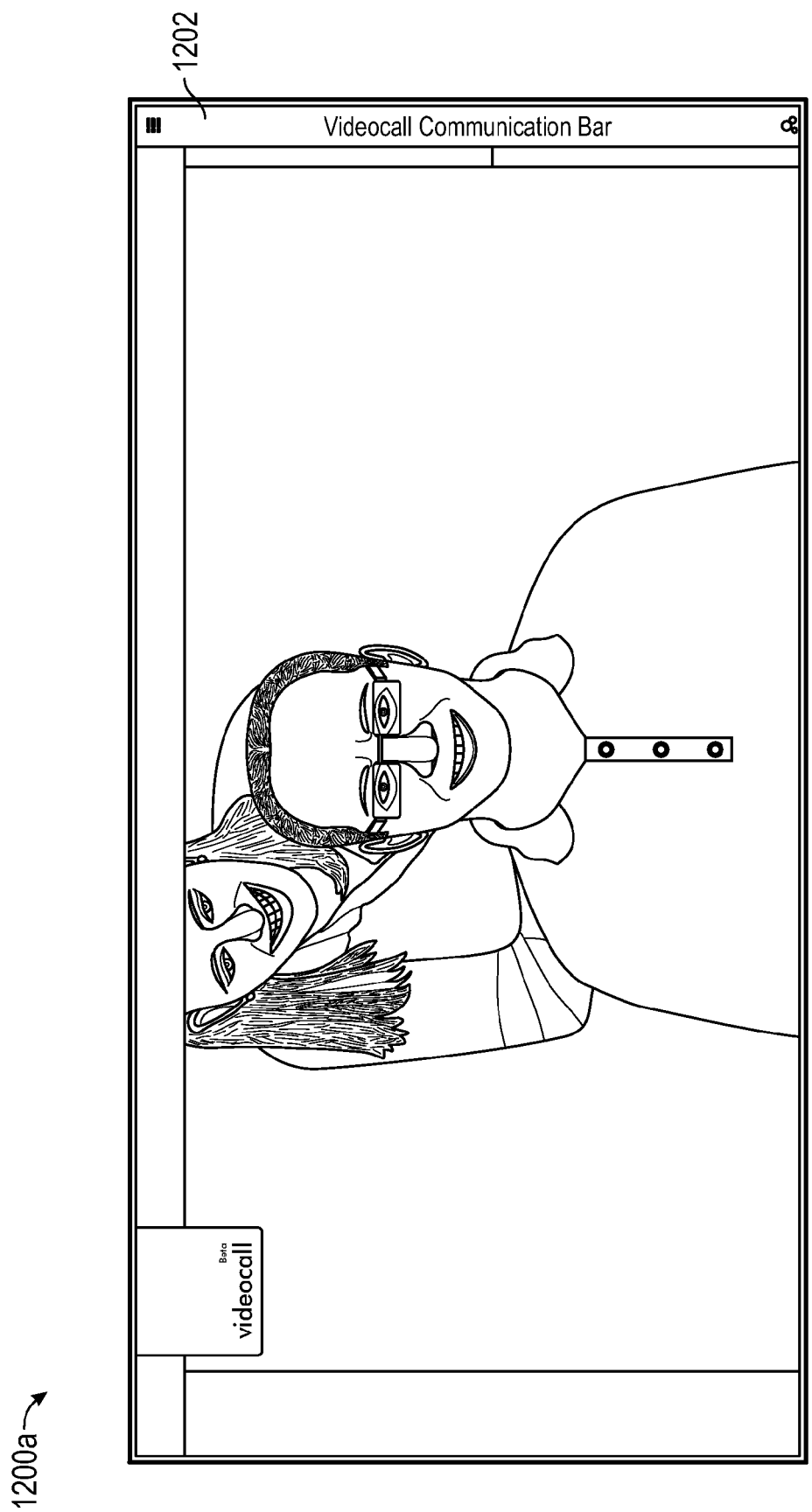
FIG. 12A is a view of a webpage comprising a video call initiating option, that is an embodiment of the present invention.

FIG. 12A shows an example of a webpage 1100a that incorporates a view of one or more participants in the video call, as well as a video call enabling option 1102 that is presented as a sidebar on the webpage. As described herein, the video call enabling option may be incorporated into any website through the operation of a video call enabling code generating unit of the system. The video call enabling option is generated and supported so that it is embedded in a webpage or otherwise made available via a webpage in accordance with the function of the video call enabling code generating unit of the system. The video call engaging option code generated by the unit provides a script that determines the function of the video call enabling option upon selection of the video call enabling option by a user of the webpage, or a visitor to the webpage. The video call engaging option code may be of a variety of code formats, for example, such as a Java script that is operable without any third party plugins. Such a script can be embedded directly into the respective webpage. A skilled reader will recognize that other code formats can also be utilized in the present invention.

In embodiments of the present invention, the video call initiating code may use WebRTC API which supports browser-to-browser applications for voice calling, video chat, and P2P file sharing without plug-ins.

Figure 12B:
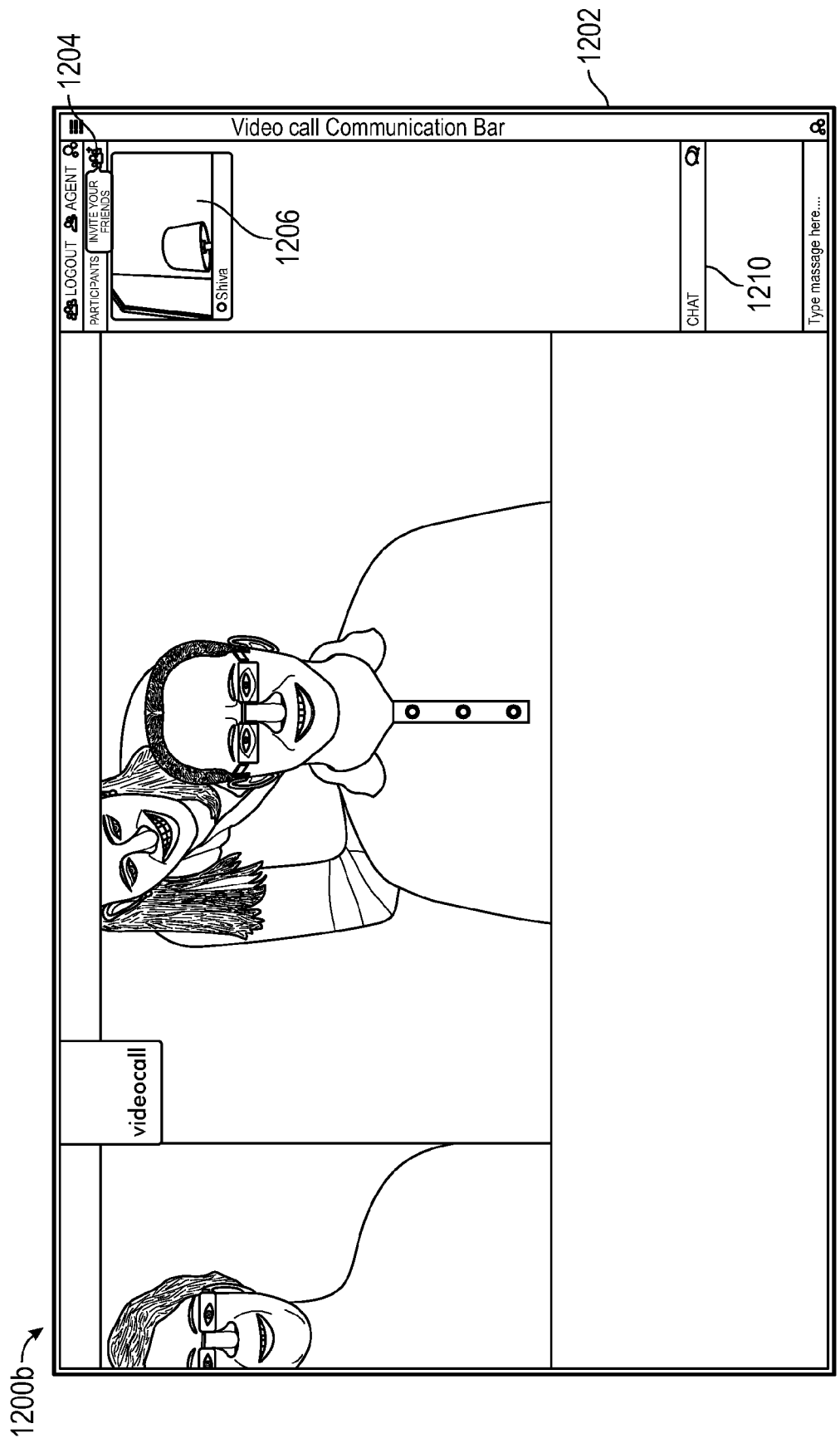
FIG. 12B is a view of a webpage operable for a video call initiation in the webpage through a user utilizing a video call initiating option, that is an embodiment of the present invention.

FIG. 12B shows an example of a webpage 1100b that incorporates a view of participants in the video call separated into segments and each segment shows a view of the participant(s) that have joined the video call via a particular computing or mobile device. Webpage 1100b further incorporates a video call enabling option 1102 that is presented as a sidebar on the webpage, and a video call invitation option 1104. The video call invitation option 1104 can be utilized by a participant to the video call to invite one or more persons to join video call, in the manner discussed herein. The webpage may also incorporate the video call initiator's self video displaying block 1106 that displays the webcam or other camera view of the call initiator participating in the call. As shown in FIG. 11B if webcam or other camera view may not necessarily show the initiator, but will show the view of the webcam or the other camera used to capture the initiator's location from where the initiator is participating in the video call. This view is shown in real time during the video call.

The webpage 1100b may further incorporate a chat option 1110 whereby a participant in the video call can engage in written text chat with other participants during the video call. In this manner, the discussion during the video call can be both verbal and written, and both forms of discussion can occur simultaneously.

Figure 12C:
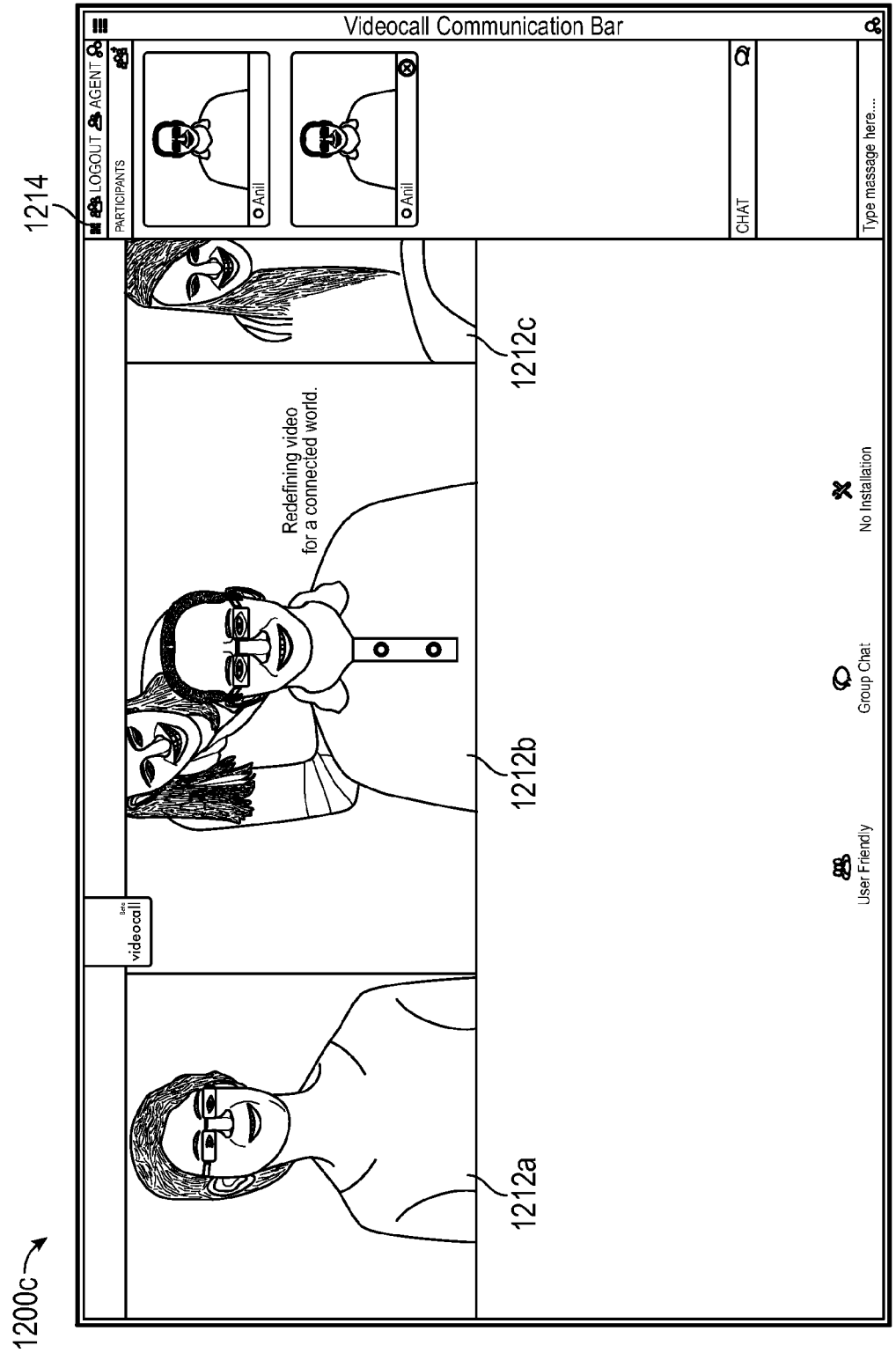
FIG. 12C is a view of a webpage showing a video call initiating option view captured while the video call is in progress, that is an embodiment of the present invention.

FIG. 12C shows an example of a webpage 1100b that incorporates multiple participants of the video call, each participant shown in a display segment 1112a, 1112b and 1112c that shows the webcam or other camera view capturing participation of the participant in the video call. A maximize button 1114 may be incorporated in the webpage that is operable to maximize a selected participant on the webpage, so that the screen will specifically show that participant in the whole of the screen, virtually whole of the screen, or as dominant in the screen as compared to other participants and elements shown in the screen.

FIG. 12D shows an example of a webpage 1100b that incorporates a maximized page view of a participant during a video call that is dominant in the screen. Buttons or other selectable options may be provided in the webpage for other amendments to the view of the participants of the video call, for example, such as a user friendly option 1116, a group chat option 1118, and a no installation option 1120.

FIGS. 13A, 13B, 13C, and 13D show examples of appearances of screens viewable by participants of a video call if the video call is initiated from a user's personalized profile page.

Figure 13A:
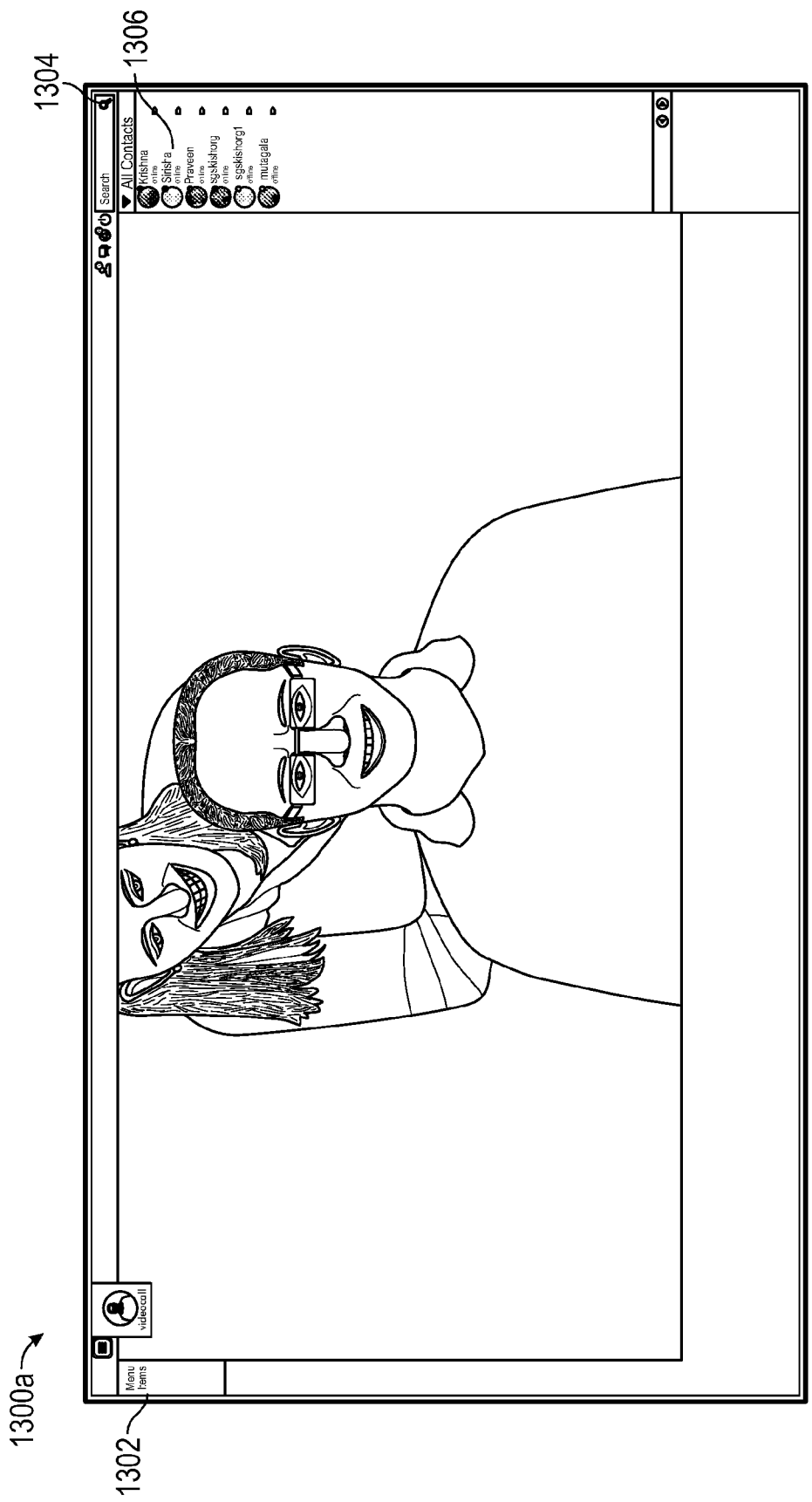
FIG. 13A is a view of a webpage showing a generated video profile page of a user, that is an embodiment of the present invention.

FIG. 13A shows an example of a user's personalized video profile page 1200a that incorporates an area for selecting and displaying menu items 1202, for example, such as menu items operable for creating groups, following friends, rooms list, change profile settings, and other menu items. The user's personalized video profile page further incorporates: a contact search bar 1204, operable to conduct a search for a particular contact in accordance with contact information inputted by a user into the contact search bar; and a user contact list 1206 whereby contacts are displayed in a list and each contact has a video icon associated therewith and the video icon is operable when selected for a user to make a call to the selected contact.

Figure 13B:
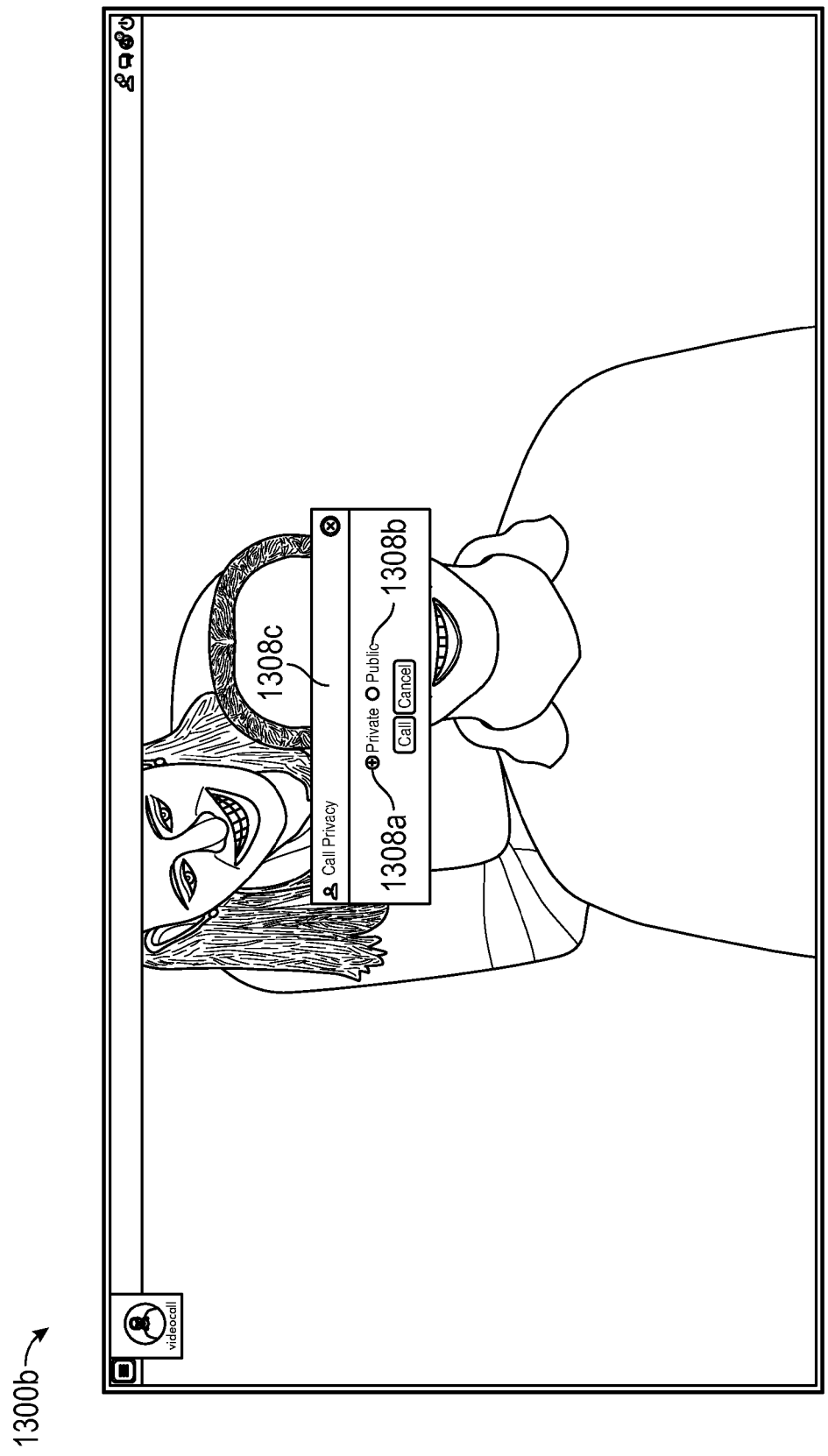
FIG. 13B is a view of a webpage showing a call privacy setting block displayed on the user profile, that is an embodiment of the present invention.

FIG. 13B shows an example of a user's personalized video profile page 1200b that incorporates a call privacy setting block 1208c. The call privacy setting block may be displayed when a user initiated a video call. The user may utilize the call privacy setting block to indicate that the video call is private by selecting the private option 1208a, or to indicate that the video call is public by selecting the public option 1208b. Selecting the public option will cause the system to make the video information accessible to all of the followers of the user, and the user's status may be displayed in a public profile page of the user. Selecting the private option will cause the system to not provide video information to any followers of the user or to display the user's status in any public profile page of the user. When the system functions in private mode the profile page of a participant can only be viewed by the followers of the participant. When the system functions in public mode the profile page of a participant can be viewed by all participants of the system. The system may be set as a default mode to select the private option.

Figure 13C:
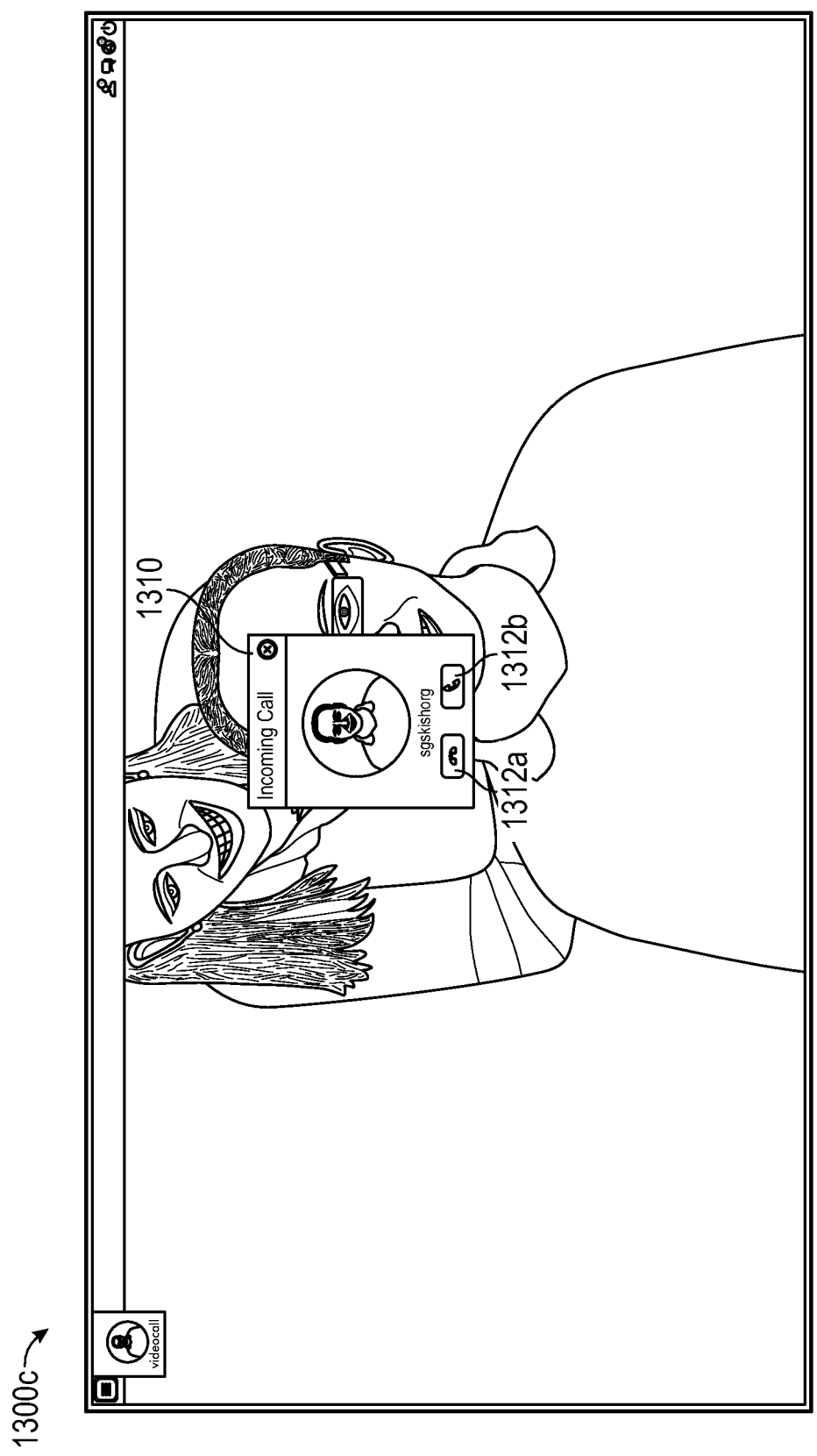
FIG. 13C is a view of a webpage showing an incoming call alert on the user video profile page, that is an embodiment of the present invention.

FIG. 13C shows an example of a user's personalized video profile page 1200c that incorporates an incoming call alert block 1210 whereby a user is alerted to an incoming call from a potential participant who wants to join a video call in progress. The user can accept an incoming call by selecting the incoming call accept option 1212a, or reject an incoming call by selecting the incoming call reject option 1212a. Information as to whether the user accepts or rejects the incoming call will be transmitted by the system to the caller by a video call informer constructor unit that is incorporated in the video call socket server.

Figure 13D:
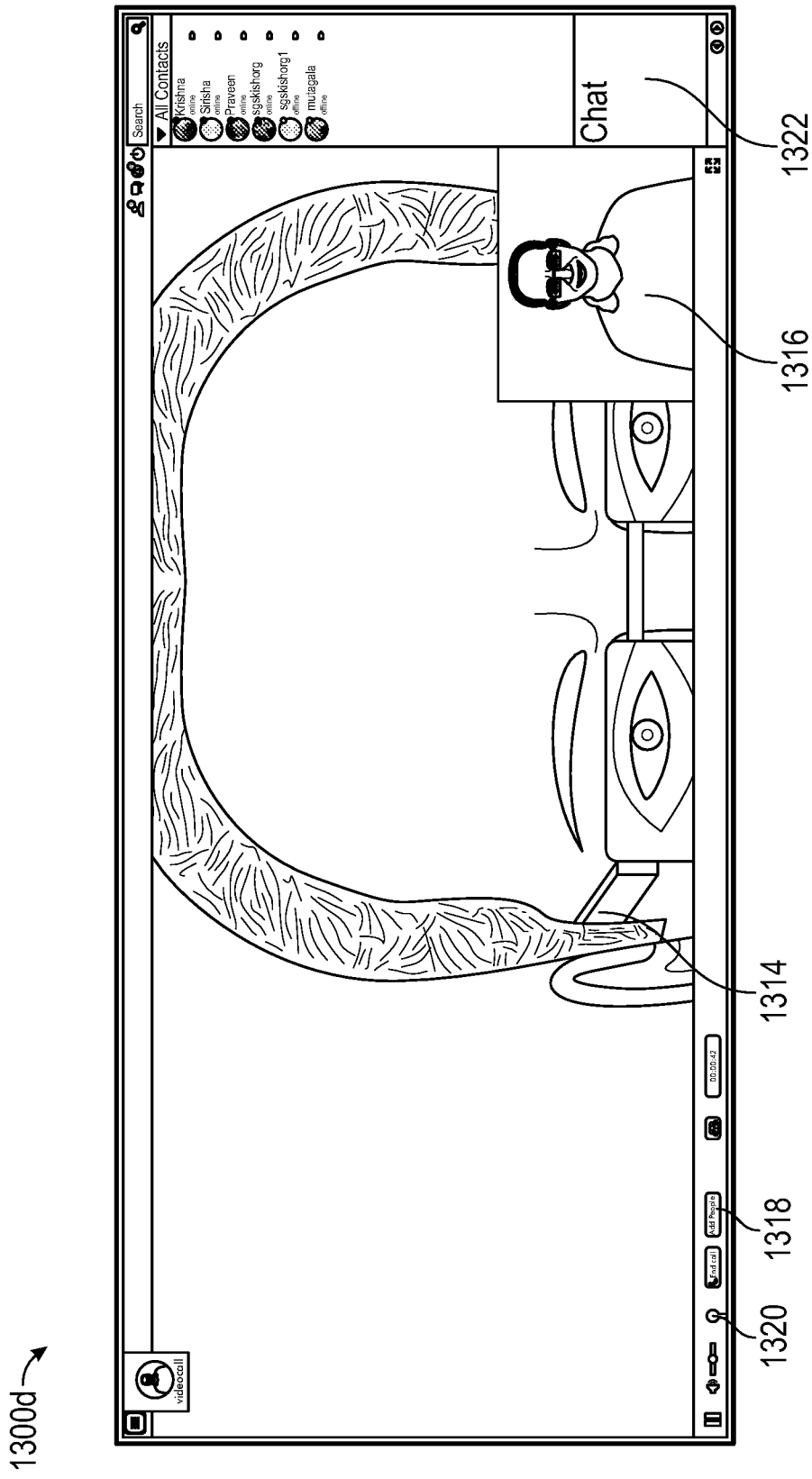
FIG. 13D is a view of a webpage showing an established video call page, that is an embodiment of the present invention.

FIG. 13D shows an example of a user's personalized video profile page 1200d that incorporates an established video call page 1200d that further incorporates a calling person video 1214, a user self video 1214, an invite members option 1218, a record option 1220 whereby the user can initiate a recording of the video call on the user's device that the user is utilizing the engage in the video call, and a chat area 1222 operable for a user to chat in written text with one or more other participants to the video call.

FIGS. 14A and 14B show examples of appearances of either screens or portions of screens viewable by participants of a video call to show information relating to followers of a participant of the video call and/or persons a participant of the video call are following.

FIG. 14A shows an example of a webpage 1200e that incorporates a following information display page 1224 that displays a list of the persons who the participant is following. An option may be provided whereby the participant can unfollow any of the listed persons the participant is following from the list. The list of persons that the participant is following can be utilized by the participant to send invitations to one or more of the listed persons to join the video call. For example, a participant may select one or more persons from a list of persons that the participant is following. Once selected the system may provide a means whereby the participant can select the option of sending an invitation to the selected person to join a video call session. A skilled reader will recognize that other steps may be implemented into the system whereby a person who a participant is following may be invited to join a video call session by a participant.

FIG. 14B shows an example of a webpage that incorporates a followers information display page 1226 that displays a list of the followers of the participant of the video call. An option may be provided whereby the participant can remove any of the listed followers from the list. The list of followers can be utilized by the participant to send invitations to one or more of the followers to join the video call.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents. It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

An embodiment of the present invention may be available in a software application ("app") format that is accessible and utilizable from a mobile device. The app version of the present invention will involve the same functions and features as is available for the browser version of the present invention described herein.

I claim:

1. A video call system comprising:
    (a) a first webpage;
    (b) a video call enabling code generating unit operable to receive information inputted into said first webpage and to generate a video call enabling code that utilizes said inputted information; and
    (c) a video call enabling option operable from a second webpage that is operable to run said video call enabling code upon selection of said video call enabling option, wherein said video call system is operable to generate a video call between a user of said second webpage and one or more other participants.

2. The video call system of claim 1, wherein the inputted information incorporates the domain name address of said second webpage.

3. The video call system of claim 1, wherein said second webpage is connected to the Internet, and is operable to send messages to one or more persons via the Internet prior to and during the video call, wherein said one or more persons form part of said one or more participants.

4. The video call system of claim 1, operable to join a plurality of participants to the video call during said video call.

5. A video call method, comprising the steps of:
(a) receiving a request for a video call enabling code for a first webpage;
(b) generating said video call enabling code comprising a video call enabling key for said first webpage;
(c) using said video call enabling code in said first webpage for generating a video call initiating option on said first webpage; and
(d) enabling a first user to complete a registration process, wherein in response to completing said registration process, a personalized profile page with a corresponding personalized video call account is created for said first user on a second webpage, whereby a selection of said video call initiating option on said first webpage by a second user initiates a video call between said second user and said first user, wherein said personalized profile page and said personalized video call account being used for initiating said video call by said second user to said first user.

6. The method of claim 5, further comprising a step of enabling said first user to transmit one or more invitations to a corresponding one or more other users to join said video call.

7. The method of claim 5, further comprising a step of displaying said video call initiating option as a sidebar on said first webpage.

8. The method of claim 5, wherein said first user is enabled to permanently delete one or more invitees from said video call during the continuation of said video call.

9. The method of claim 5, wherein said video call enabling key is utilized to restrict usage of said generated video call enabling code only to said first webpage such that said using of said video call enabling code on any other webpage renders said video call enabling code to not run, and thereby disallowing the initiation of said video call.

10. A video call system comprising:
(a) a first device connected to a network;
(b) a user registration unit to receive information inputted by a first user of said first device;
(c) an application programming interface with socket, operable to receive a video call request inputted by said first user of said first device;
(d) a video call session establishing and creating unit connected to said application programming interface with socket and operable to create and establish a video call session between said first user of said first device and a second user of a second device; and
(e) a data repository unit operable to store data, including said information inputted by said first user of said first device.

11. The video call system of claim 10, wherein a video call recording unit is operable to record said video call session.

12. The video call system of claim 10, wherein said first user who initiates said video call operates the system to limit the participation of said second user engaged in the video call.

13. The video call system of claim 10, wherein a video call recording unit is operable to record said video call session as a video call file, and said video call recording unit is connected to said data repository unit such that said video call file is stored in said data repository unit.

14. The video call system of claim 10, wherein an identity verification unit is operable to utilize said registration information inputted by a user to verify the identity of said user.

15. The video call system of claim 10, wherein a video profile page managing unit is operable to create a profile page for said first user.

16. The video call system of claim 15, wherein a video call can be initiated from said profile page of said first user.

17. The video call system of claim 16, wherein said video call session establishing and creating unit is operable to create and establish a video call as a public call such that any user may initiate a video call on said profile page to said first user, whether or not such user is an invitee of said first user to said video call.

* * * * *